(12) United States Patent
Sawamoto

(10) Patent No.: US 9,749,492 B2
(45) Date of Patent: Aug. 29, 2017

(54) BEAM ADJUSTMENT METHOD FOR OPTICAL SCANNING DEVICE AND OPTICAL SCANNING DEVICE

(71) Applicant: KYOCERA Document Solutions Inc., Osaka-shi, Osaka (JP)

(72) Inventor: Chika Sawamoto, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 28 days.

(21) Appl. No.: 15/084,394

(22) Filed: Mar. 29, 2016

(65) Prior Publication Data

US 2016/0295059 A1 Oct. 6, 2016

(30) Foreign Application Priority Data

Mar. 30, 2015 (JP) ................. 2015-069440

(51) Int. Cl.
*H04N 1/04* (2006.01)
*H04N 1/024* (2006.01)
(Continued)

(52) U.S. Cl.
CPC ..... *H04N 1/02409* (2013.01); *G06K 15/1228* (2013.01); *H04N 1/06* (2013.01);
(Continued)

(58) Field of Classification Search
CPC ....... G01J 3/06; G02B 26/00; G02B 26/0833; G02B 26/0841; G02B 26/085; G02B 26/0858; G02B 26/0866; G02B 26/103; G02B 26/105; G02B 26/129; G02B 26/10; G02B 26/12; G02B 26/127; G02B 26/121; G02B 26/101; G02B 26/004; G02B 26/005; G02B 26/08; G02B 26/108;
(Continued)

(56) References Cited

U.S. PATENT DOCUMENTS 6,320,647 B1 * 11/2001 Makino .................... B41J 2/473
355/67
2002/0196514 A1 * 12/2002 Atsuumi .............. G02B 26/124
359/210.1
(Continued)

FOREIGN PATENT DOCUMENTS

| JP | 03107811 A | 5/1991 |
| JP | 2000154748 A | 6/2000 |
| JP | 2009002986 A | 1/2009 |

*Primary Examiner* — Jennifer L. Doak
(74) *Attorney, Agent, or Firm* — Alleman Hall Creasman & Tuttle LLP

(57) ABSTRACT

A housing of an optical scanning device includes a first abutting portion and a second abutting portion. In the optical scanning device, an optical axis adjustment and a focal position adjustment in a main scanning direction and a sub scanning direction are conducted in a state where a part of a holder that holds a light source unit for emitting multi-beam light abuts on the first abutting portion and in a state where a part of a peripheral edge of an optical element that has both a collimator lens function and a cylindrical lens function abuts on the second abutting portion. Furthermore, a beam pitch of the multi-beam light is adjusted by rotating the holder around an optical axis in a state where the holder abuts on the first abutting portion.

4 Claims, 25 Drawing Sheets

(51) Int. Cl.
*H04N 1/113* (2006.01)
*H04N 1/06* (2006.01)
*G06K 15/12* (2006.01)

(52) U.S. Cl.
CPC ..... *H04N 1/113* (2013.01); *H04N 2201/0081* (2013.01); *H04N 2201/0082* (2013.01)

(58) Field of Classification Search
CPC .... G02B 26/0816; G02B 5/09; G02B 26/123; G02B 26/124; G02B 27/286; G02B 26/0808; G02B 26/106; G02B 26/125; G02B 13/0005; H04N 1/113; H04N 1/1135
See application file for complete search history.

(56) References Cited

U.S. PATENT DOCUMENTS

| | | | |
|---|---|---|---|
| 2008/0316559 A1 | 12/2008 | Nagaoka et al. | |
| 2014/0146332 A1* | 5/2014 | Watanabe | G02B 26/123 358/1.13 |
| 2016/0018638 A1* | 1/2016 | Kawano | G02B 26/123 347/118 |
| 2016/0295059 A1* | 10/2016 | Sawamoto | H04N 1/02409 |

* cited by examiner

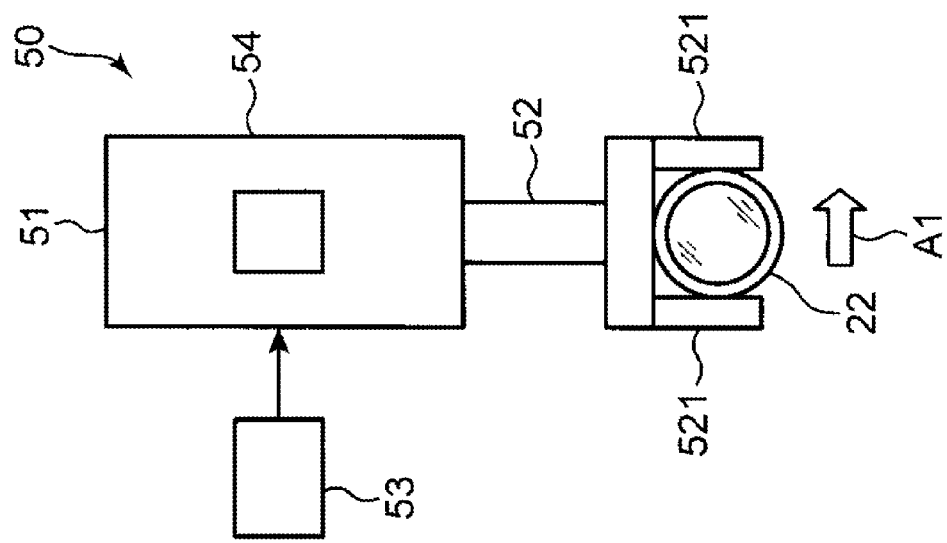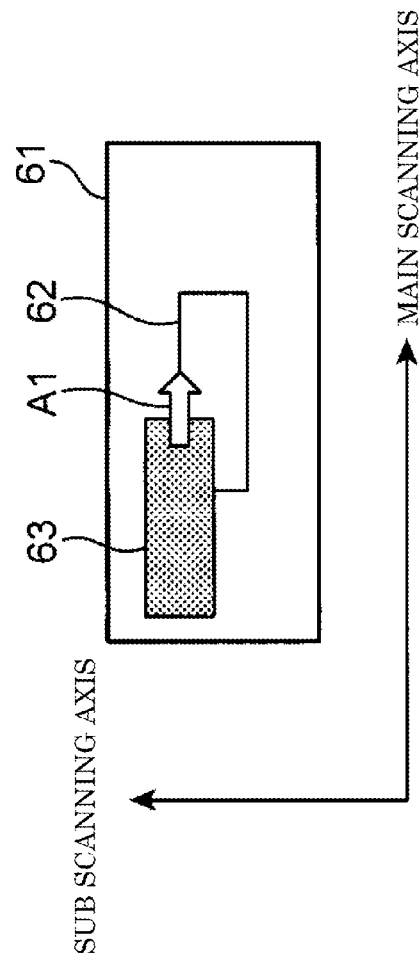

BEAM ADJUSTMENT METHOD FOR OPTICAL SCANNING DEVICE AND OPTICAL SCANNING DEVICE

INCORPORATION BY REFERENCE

This application is based upon and claims the benefit of priority from the corresponding Japanese Patent Application No. 2015-069440 filed on Mar. 30, 2015, the entire contents of which are incorporated herein by reference.

BACKGROUND

The present disclosure relates to an optical scanning device using a multi-beam-type light source for scanning a scanned surface, and to a beam adjustment method for use therein.

An image forming apparatus such as a laser printer or a copier includes an optical scanning device for forming an electrostatic latent image by scanning a circumferential surface (scanned surface) of a photoconductor drum. The optical scanning device includes: a light source for emitting a light beam; a deflector for deflecting the light beam; an incident optical system for causing the light beam to be incident on a reflection surface of the deflector; and a focusing optical system for causing the deflected light beam (scanning light beam) to focus on the scanned surface. The incident optical system includes, as optical elements, a collimator lens and a cylindrical lens, wherein the collimator lens converts diffused light beams to parallel light beams, and the cylindrical lens converts the parallel light beams to line-like light beams and focuses the light beams on the reflection surface of the deflector.

A multi-beam-type light source that emits a plurality of light beams may be used as the light source. In addition, a function-integrated-type optical element that has both a collimator lens function and a cylindrical lens function may be used as an optical element of the incident optical system. In the case where the function-integrated-type optical element is used, during an optical adjustment performed when the optical scanning device is assembled, the beam diameters in the main scanning direction and the sub scanning direction cannot be adjusted independently of each other. According to a known conventional method for coping with the problem, the beam diameters are adjusted by integrally moving the light source and the function-integrated-type optical element in the optical axis direction in the state where the positional relationship between the light source and the function-integrated-type optical element is established.

SUMMARY

A beam adjustment method according to an aspect of the present disclosure is for use in an optical scanning device that includes a housing, and a light source for emitting multi-beam light, a holder for holding the light source, an optical element having both a collimator lens function and a cylindrical lens function, an aperture, a deflector, and a focusing optical system that are stored in the housing in alignment in an optical axis direction, the optical scanning device further including a first abutting portion which has a predetermined width in the optical axis direction and on which a part of the holder abuts in a main scanning direction, and a second abutting portion which has a predetermined width in the optical axis direction and on which a part of a peripheral edge of the optical element abuts in a sub scanning direction. The beam adjustment method includes: a step of allowing a first adjusting tool to hold the holder and allowing a second adjusting tool to hold the optical element, the first adjusting tool being configured to move in the sub scanning direction and the optical axis direction and rotate around an optical axis, and the second adjusting tool being configured to move in the main scanning direction and the optical axis direction; a step of installing the aperture, the deflector, and the focusing optical system at predetermined designed positions in the housing, arranging the holder at a predetermined designed position in a state where a part of the holder held by the first adjusting tool abuts on the first abutting portion, and arranging the optical element at a predetermined designed position in a state where a part of the peripheral edge of the optical element held by the second adjusting tool abuts on the second abutting portion; a step of adjusting the optical axis in the sub scanning direction by moving the first adjusting tool in the sub scanning direction while keeping the holder abutting on the first abutting portion, and adjusting the optical axis in the main scanning direction by moving the second adjusting tool in the main scanning direction while keeping the optical element abutting on the second abutting portion; a step of adjusting a focal position in the main scanning direction such that light beams having passed through the aperture become parallel to each other, by moving the second adjusting tool in the optical axis direction while keeping the optical element abutting on the second abutting portion; a step of adjusting a focal position in the sub scanning direction such that light beams are focused on a defection surface of the deflector or a scanned surface, by integrally moving the first adjusting tool and the second adjusting tool in the optical axis direction while maintaining a positional relationship between the first adjusting tool and the second adjusting tool, keeping the holder abutting on the first abutting portion, and keeping the optical element abutting on the second abutting portion; a step of adjusting a beam pitch by rotating the holder around the optical axis while keeping the holder abutting on the first abutting portion; and a step of fixing the part of the holder to the first abutting portion and fixing the part of the peripheral edge of the optical element to the second abutting portion.

An optical scanning device according to another aspect of the present disclosure includes a light source unit, an optical element, an aperture, a deflector, a focusing optical system, and a housing. The light source unit is held by a holder and configured to emit multi-beam light. The optical element has both a collimator lens function and a cylindrical lens function, and the multi-beam light is incident on the optical element. The aperture is configured to restrict the multi-beam light that has passed through the optical element. The deflector is configured to reflect the multi-beam light that has passed through the aperture and cause the multi-beam light to scan a scanned surface in a main scanning direction. The focusing optical system is disposed between the deflector and the scanned surface and configured to focus the multi-beam light on the scanned surface. The housing stores the light source unit, the optical element, the aperture, the deflector, and the focusing optical system that are aligned in an optical axis direction in the stated order. The housing includes: a first abutting portion which has a predetermined width in the optical axis direction and on which a part of the holder abuts in the main scanning direction; a second abutting portion which has a predetermined width in the optical axis direction and on which a part of a peripheral edge of the optical element abuts in a sub scanning direction; a first fixing portion configured to fix the part of the holder to the first abutting portion; and a second fixing portion configured to fix the part of the peripheral edge of the optical element to the second abutting portion. The holder is positioned in the main scanning direction by abutting on the first abutting portion, and the optical element is positioned in the sub scanning direction by abutting on the second abutting portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 16A and FIG. 16B are diagrams for explaining how the optical axis adjustment in the main scanning direction is conducted.

DETAILED DESCRIPTION

Figure 1:
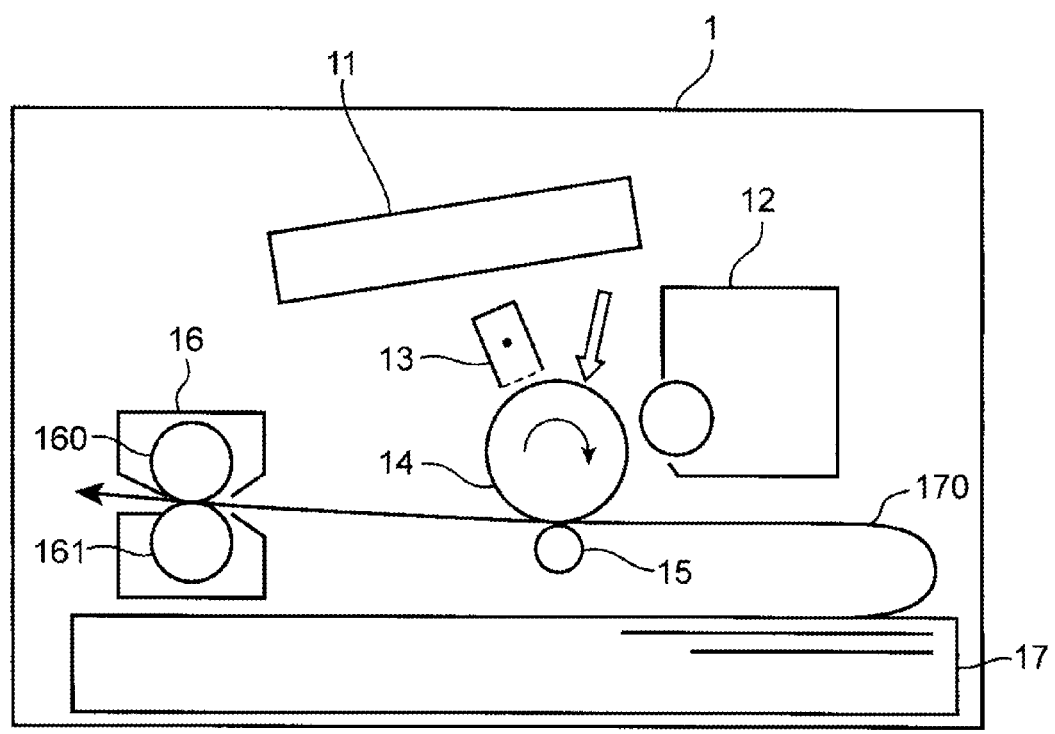
FIG. 1 is a cross-sectional view schematically showing the configuration of an image forming apparatus to which an optical scanning device according to the present disclosure is applied.

The following describes an embodiment of the present disclosure with reference to the drawings. FIG. 1 is a cross-sectional view schematically showing the configuration of an image forming apparatus 1 including an optical scanning device 11 according to the present disclosure. The image forming apparatus 1 includes the optical scanning device 11, a developing unit 12, a charging unit 13, a photoconductor drum 14, a transfer roller 15, a fixing unit 16, and a sheet feed cassette 17.

The photoconductor drum 14 is a cylindrical member, and an electrostatic latent image and a toner image are formed on its circumferential surface. Upon receiving a driving force from a motor (not shown), the photoconductor drum 14 is rotated clockwise in FIG. 1. The charging unit 13 charges the surface of the photoconductor drum 14 approximately uniformly.

The optical scanning device 11 forms an electrostatic latent image of image data by irradiating a laser beam in accordance with the image data, on the circumferential surface (scanned surface) of the photoconductor drum 14 that has been charged approximately uniformly by the charging unit 13. The optical scanning device 11 includes a light source and a function-integrated-type optical element, wherein the light source emits multi-beam light, and the function-integrated-type optical element has both a collimator lens function and a cylindrical lens function. The optical scanning device 11 is described in detail below.

The developing unit 12 forms a toner image by supplying toner to the circumferential surface of the photoconductor drum 14 on which the electrostatic latent image has been formed. The developing unit 12 includes a developing roller and a screw, wherein the developing roller carries the toner, and the screw conveys the toner while stirring the toner. The toner image formed on the photoconductor drum 14 is transferred to a recording sheet that has been fed from the sheet feed cassette 17 and conveyed in a conveyance path 170. The developing unit 12 receives supply of toner from a toner container (not shown).

The transfer roller 15 is disposed below the photoconductor drum 14 to face the photoconductor drum 14 such that a transfer nip portion is formed therebetween. The transfer roller 15 is made of a material, such as rubber, that has conductivity, and upon receiving a transfer bias, transfers the toner image formed on the photoconductor drum 14 to the recording sheet.

The fixing unit 16 includes a fixing roller 160 and a pressure roller 161, wherein a heater is embedded in the fixing roller 160, and the fixing roller 160 and the pressure roller 161 form a fixing nip portion. When a recording sheet with the toner image formed thereon passes through the fixing nip portion, the toner image is fixed to the recording sheet.

The following is a brief description of an image forming operation of the image forming apparatus 1. First, the surface of the photoconductor drum 14 is charged approximately uniformly by the charging unit 13. The charged circumferential surface of the photoconductor drum 14 is exposed by the optical scanning device 11 and an electrostatic latent image of an image to be formed on a recording sheet is formed on the circumferential surface of the photoconductor drum 14. The electrostatic latent image is visualized as a toner image when toner is supplied from the developing unit 12 to the circumferential surface of the photoconductor drum 14. On the other hand, a recording sheet is fed from the sheet feed cassette 17 to the conveyance path 170. When the recording sheet passes through the transfer nip portion, the toner image is transferred to the recording sheet. After this transfer operation, the recording sheet is conveyed to the fixing unit 16 (the fixing nip portion), and the toner image is fixed to the recording sheet.

Figure 2:
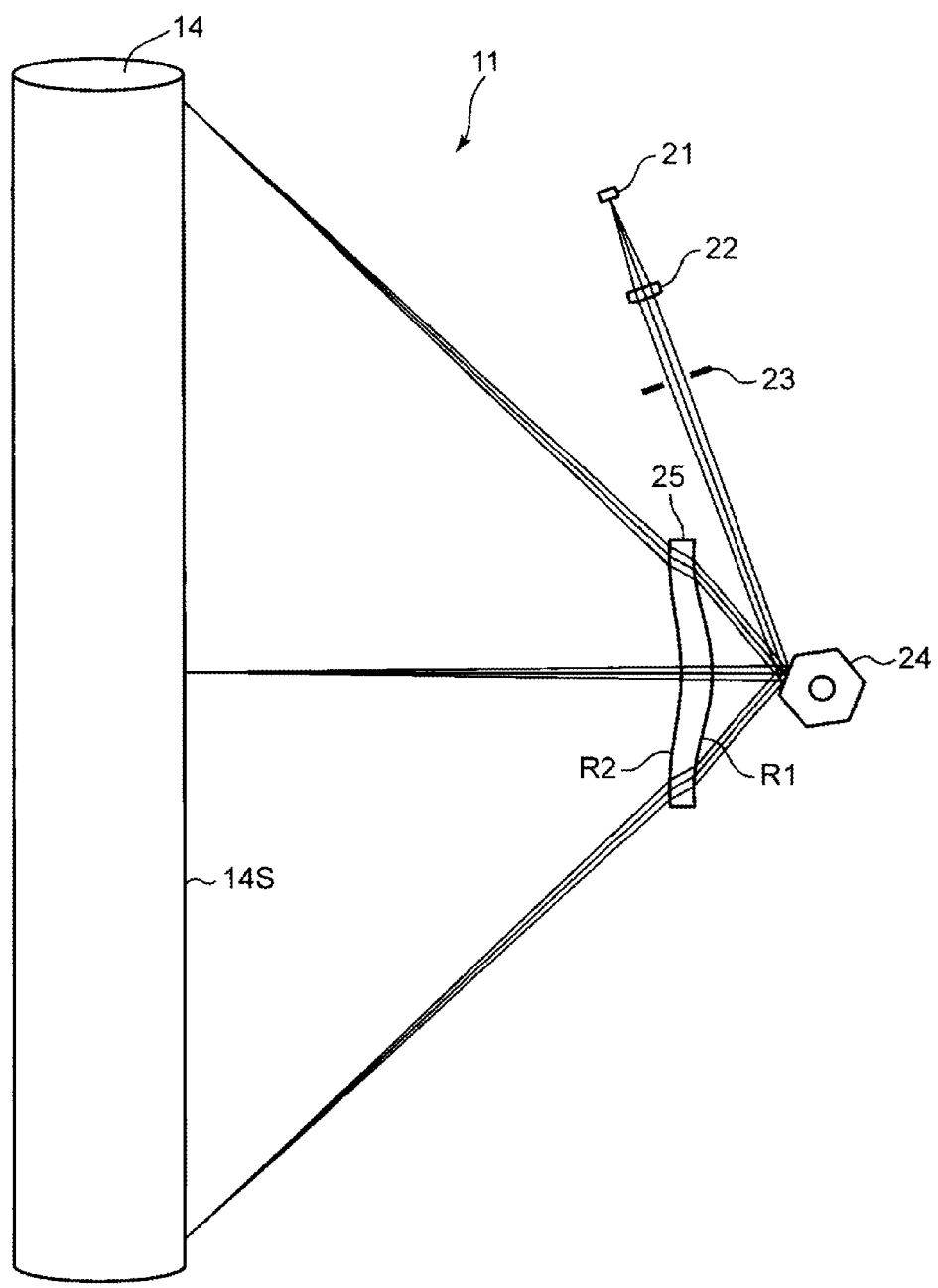
FIG. 2 is an optical path diagram showing the configuration of the optical scanning device according to the present disclosure in a cross section taken along a plane including the main scanning direction.

Next, the optical scanning device 11 is described in detail. FIG. 2 is a plan view showing the configuration of the optical scanning device 11 in a cross section taken along a plane including the main scanning direction. The optical scanning device 11 includes a light source unit 21 (the light source), an optical element 22, an aperture 23, a polygon mirror 24 (the deflector), and a scanning lens 25 (the focusing optical system) that are arranged in sequence in the optical axis direction. Although a scanning optical system including only a single scanning lens is shown in this example, the scanning optical system may include two or more scanning lenses. In addition, the deflector may be a MEMS mirror.

The light source unit 21 is a multi-beam-type light source that emits a plurality of laser beams (light beams) of a predetermined wavelength (for example, 780 nm). Including a plurality of (for example, two to four) laser diodes each of which emits a light beam, the light source unit 21 emits multi-beam light that includes a plurality of laser beams (light beams) for scanning a circumferential surface 14S of the photoconductor drum 14, wherein the circumferential surface 14S is the scanned surface. By way of example, a monolithic-type 2-beam laser unit is a preferable example of the light source unit 21.

The optical element 22 is an element on which the multi-beam light is incident, and exerts both the collimator lens function and the cylindrical lens function. That is, the optical element 22 has the collimator lens function and the cylindrical lens function, wherein the collimator lens function converts diffused light beams emitted from the light source unit 21, to parallel light beams, and the cylindrical lens function converts the parallel light beams to line-like light beams that are elongated in the main scanning direction and focuses the light beams on the reflection surface of the polygon mirror 24. In the optical element 22, the incident surface is made as a refractive surface and the emission surface is made as a diffractive surface so that the optical element 22 can exert these functions. It is noted that, in the optical element 22, the emission surface may be made as a refractive surface and the incident surface may be made as a diffractive surface.

The aperture 23 restricts the light beams that have passed through the optical element 22. The aperture 23 is a plate member with an opening formed therein such that the light beams can pass through the opening. The aperture 23 restricts the beam width of the light beams that are travelling toward the scanned surface, thereby stabilizing the beam spot diameter on the scanned surface at the focal position.

The polygon mirror 24 deflects, by reflecting, the light beams that have passed through the aperture 23, and causes the deflected light beams to scan the circumferential surface 14S (the scanned surface) of the photoconductor drum 14 in the main scanning direction. The polygon mirror 24 is a polygon mirror having reflection surfaces formed along the sides of a regular polygon, and is driven by a polygon motor 24M (FIG. 7) to rotate around a rotation axis.

The scanning lens 25 is disposed between the polygon mirror 24 and the circumferential surface 14S, and collects the light beams deflected by the polygon mirror 24 and focuses the light beams on the circumferential surface 14S. The scanning lens 25 is a lens having the fθ characteristic, and is elongated in the main scanning direction. By way of example, a lens manufactured by a die/mold molding using a light-transmissive resin material is preferably usable as the scanning lens 25. The scanning lens 25 includes an incident surface R1 and an emission surface R2, wherein the incident surface R1 faces the polygon mirror 24 and the light beams are incident on the incident surface R1, the emission surface R2 is on the opposite side to the incident surface R1 and the light beams go out from the emission surface R2.

The light beams emitted from the light source unit 21 are incident on the polygon mirror 24 after passing through the optical element 22 and the aperture 23. The light beams are then deflected by the polygon mirror 24 that is rotating around the shaft, pass through the scanning lens 25, and move toward the circumferential surface 14S of the photoconductor drum 14. With the rotation of the polygon mirror 24, the light beams scan the circumferential surface 14S.

Figure 3:
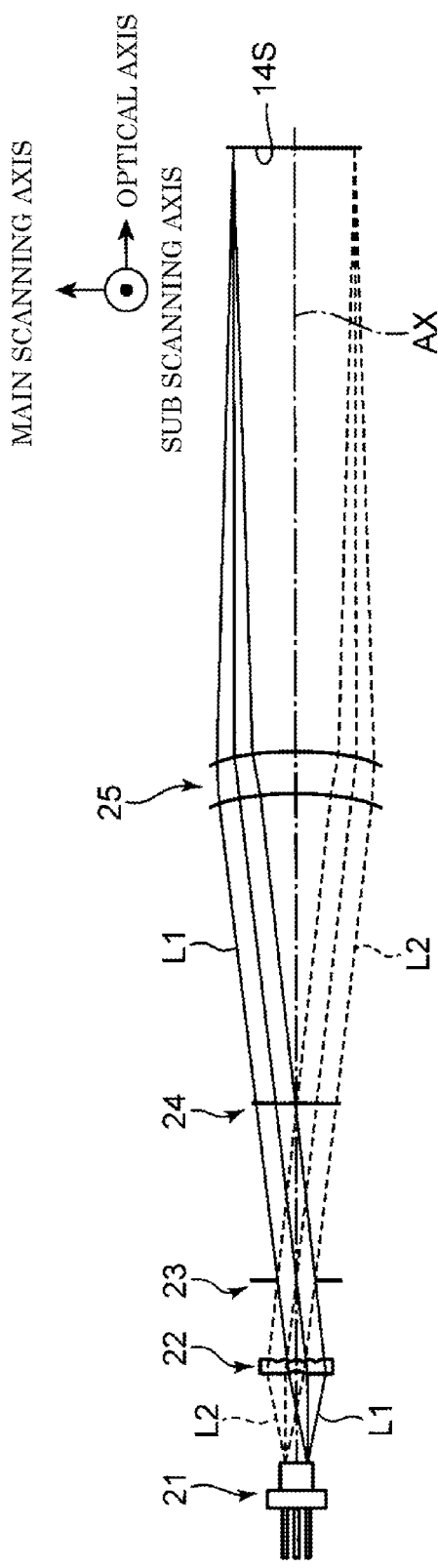
FIG. 3 is a cross section taken along a plane including the main scanning direction showing a focusing state of multi-beam light.
Figure 4:
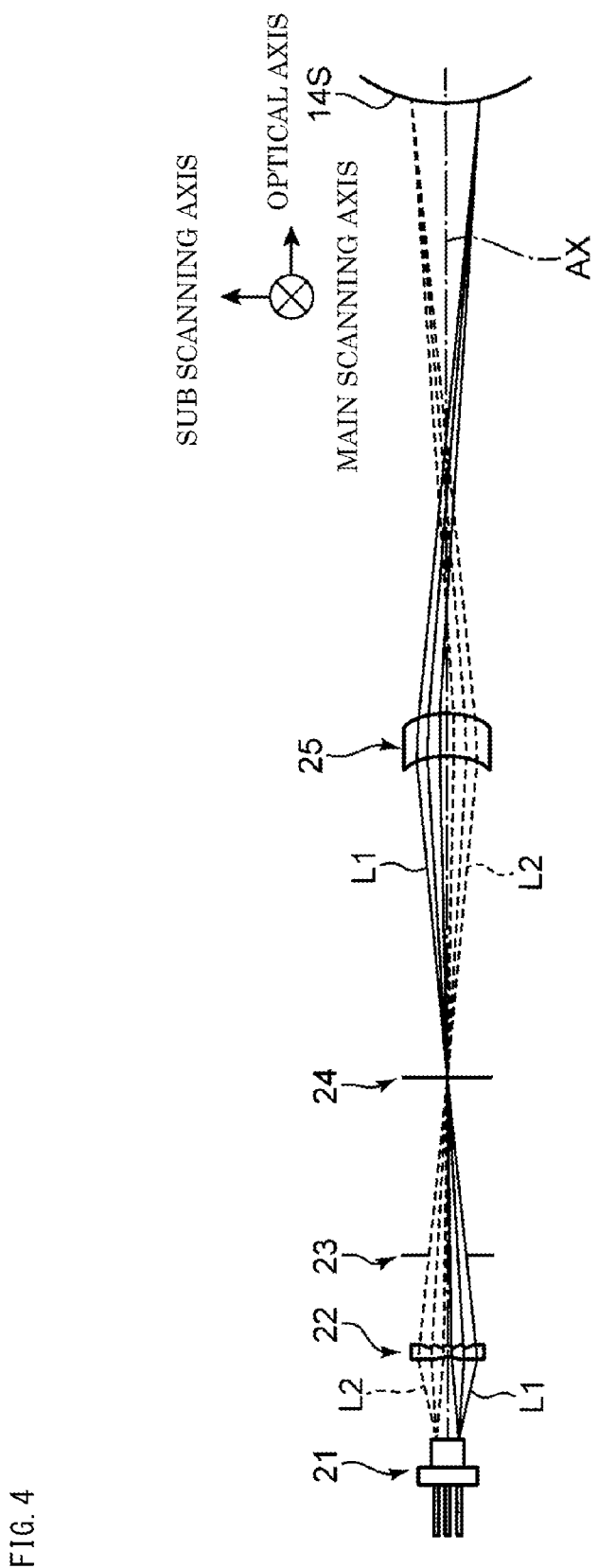
FIG. 4 is a cross section taken along a plane including the sub scanning direction showing the focusing state of the multi-beam light.

FIG. 3 is a cross section taken along a plane including the main scanning direction showing the focusing state of the multi-beam light. FIG. 4 is a cross section taken along a plane including the sub scanning direction showing the focusing state of the multi-beam light. In this example, the light source unit 21 emits two light beams: a first light beam L1; and a second light beam L2. In addition, FIG. 3 and FIG. 4 are schematic drawing in which an optical axis AX is represented by a straight line, and the light source unit 21, the optical element 22, the aperture 23, the polygon mirror 24, and the scanning lens 25 are linearly arranged on the optical axis AX.

With reference to FIG. 3 that is a cross section taken along a plane including the main scanning direction, when the first light beam L1 passes through the optical element 22, the diffused light beams are converted to the parallel light beams. When the parallel light beams pass through the aperture 23, the width of the first light beam L1 in the main scanning direction is restricted. Subsequently, the first light beam L1 that is composed of the parallel light beams is reflected by the polygon mirror 24 and is incident on the scanning lens 25. The first light beam L1 passes through the scanning lens 25, and is thereby focused on the circumferential surface 14S. Similar to the first light beam L1, the second light beam L2 is focused on the circumferential surface 14S.

Next, with reference to FIG. 4, when the first light beam L1 passes through the optical element 22, the diffused light beams are converted to convergent light beams. When the convergent light beams pass through the aperture 23, the width of the first light beam L1 in the sub scanning direction is restricted. Subsequently, the first light beam L1 is focused on the reflection surface of the polygon mirror 24, and is then incident on the scanning lens 25 as diffused light beams. By passing through the scanning lens 25, the first light beam L1 reaches the circumferential surface 14S in the state where the first light beam L1 is focused in the sub scanning direction as well. Similar to the first light beam L1, the second light beam L2 reaches the circumferential surface 14S in the state where the second light beam L2 is focused in the sub scanning direction as well.

Figure 5:
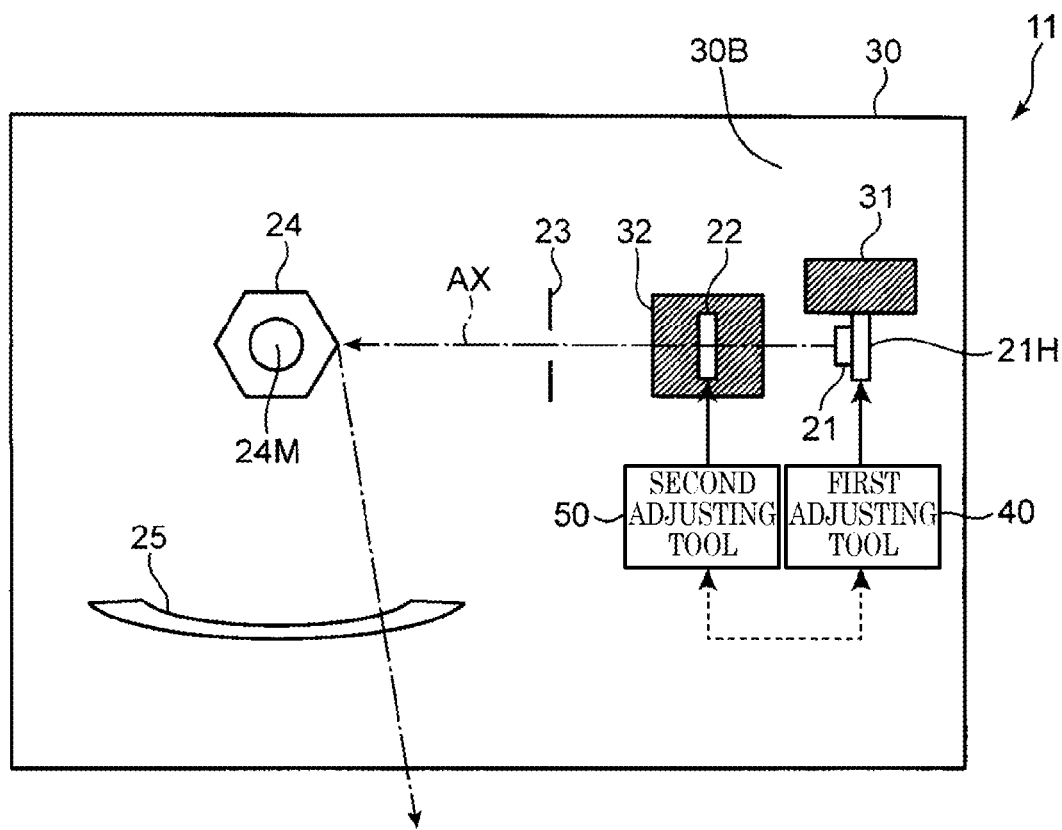
FIG. 5 is a diagram schematically showing the arrangement of optical parts of the optical scanning device in a housing.

FIG. 5 is a diagram schematically showing the arrangement of optical parts of the optical scanning device 11 in a housing. The optical scanning device 11 includes a housing 30 for storing the light source unit 21, the optical element 22, the aperture 23, the polygon mirror 24, and the scanning lens 25. The housing 30 includes a bottom plate 30B, and a first abutting portion 31 and a second abutting portion 32 that are erected on the bottom plate 30B. The light source unit 21, the optical element 22, the aperture 23, the polygon mirror 24, and the scanning lens 25 are arranged on the bottom plate 30B along the optical axis AX in the stated order.

Figure 6:
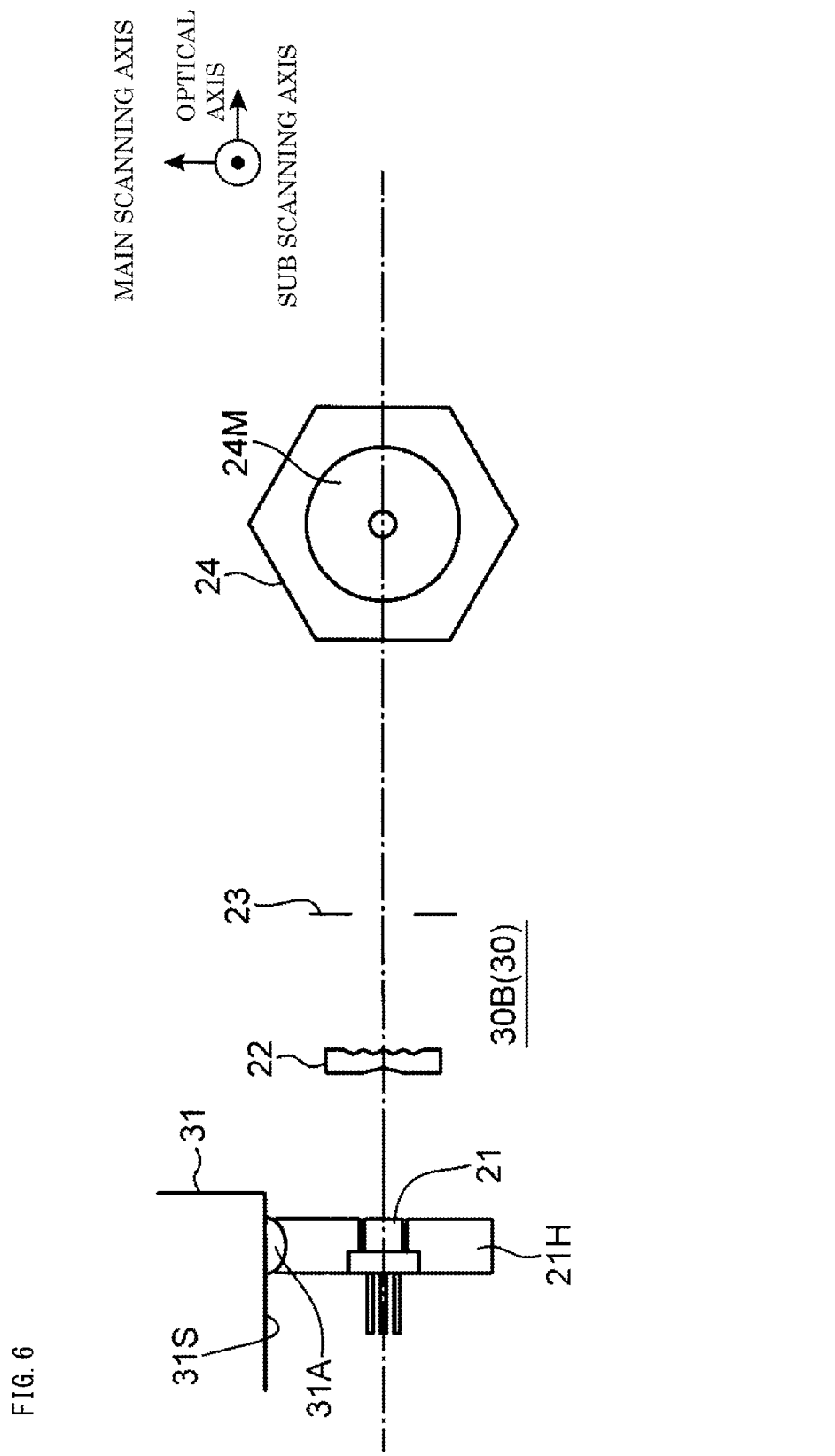
FIG. 6 is a cross section taken along a plane including the main scanning direction showing the optical parts arranged in the housing shown in FIG. 5.
Figure 7:
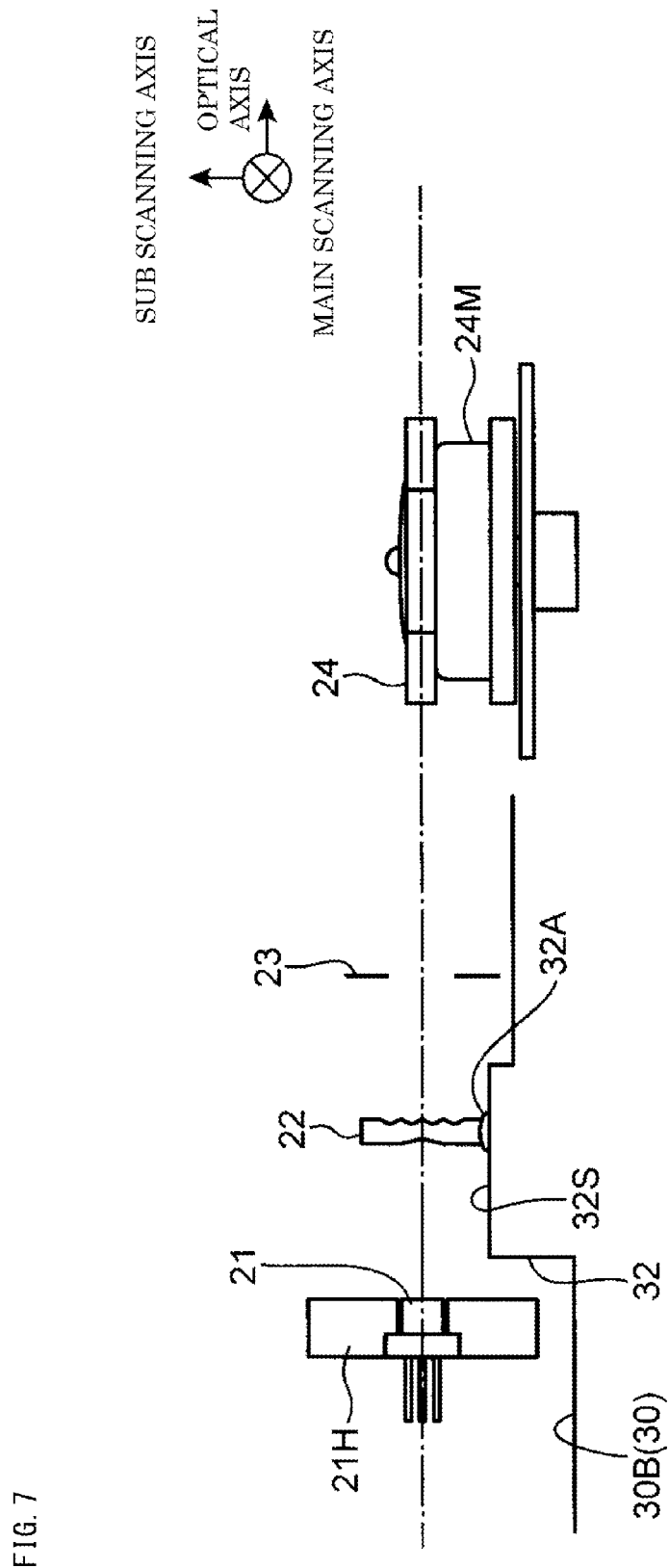
FIG. 7 is a cross section taken along a plane including the sub scanning direction showing the optical parts arranged in the housing shown in FIG. 5.
Figure 8:
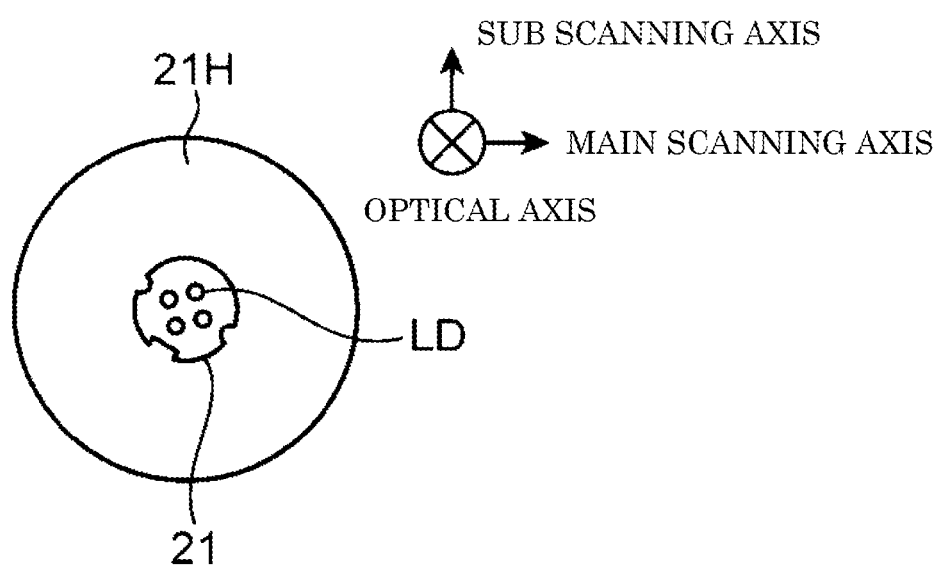
FIG. 8 is a plan view showing a light source unit held by a holder, viewed from an optical axis direction.

FIG. 6 is a cross section taken along a plane including the main scanning direction showing a part in the housing 30 extending from the light source unit 21 to the polygon mirror 24. FIG. 7 is a cross section taken along a plane including the sub scanning direction showing the same part as FIG. 6. The light source unit 21 is held by a holder 21H. FIG. 8 is a plan view showing the light source unit 21 held by the holder 21H, viewed from the optical axis AX direction.

The light source unit 21 includes a light-emitting module portion, a package portion, and a lead, wherein the light-emitting module portion includes a plurality of laser diodes, the package portion is cylindrical and covering the circumference of the light-emitting module, and the lead is extended out from the package portion. The holder 21H is made from a disk member whose thickness corresponds to the thickness of the package portion in the optical axis direction. The holder 21H has, near the center thereof, a holding hole that passes through the holder 21H in the optical axis direction. The light source unit 21 is closely fitted into the holding hole and integrated with the holder 21H. As a result, when the holder 21H is rotated around the optical axis, the light source unit 21 is rotated around the optical axis, too.

The first abutting portion 31 included in the housing 30 includes a first abutting surface 31S that is parallel to the optical axis and has a predetermined width in the optical axis direction. The first abutting surface 31S is a surface that is perpendicular to the main scanning direction, and parallel to the sub scanning direction. The second abutting portion 32 includes a second abutting surface 32S that is parallel to the optical axis and has a predetermined width in the optical axis direction. The second abutting surface 32S is parallel to the main scanning direction, and perpendicular to the sub scanning direction.

A part of the outer circumferential surface of the holder 21H (a part of the holder) abuts on the first abutting surface 31S in the main scanning direction. That is, the outer circumferential surface of the holder 21H is a circumferential surface, and a part of the circumferential surface is brought into line contact with the first abutting surface 31S. A part of the peripheral edge of the optical element 22 abuts on the second abutting surface 32S in the sub scanning direction. The optical element 22 is a cylindrical member having a predetermined thickness in the optical axis direction (see FIG. 11), and a part of the circumferential surface is brought into line contact with the second abutting surface 32S. The part of the outer circumferential surface of the holder 21H is fixed to the first abutting surface 31S by adhesive 31A (the first fixing portion). The part of the peripheral edge of the optical element 22 is fixed to the second abutting surface 32S by adhesive 32A (the second fixing portion).

In a modified embodiment, the package portion of the light source unit 21 may be used in place of the holder 21H without using the holder 21H, and the circumferential surface of the package portion may be fixed to the first abutting surface 31S. When the package portion has sufficient strength, the configuration of the modified embodiment may be adopted without using the holder 21H. In another modified embodiment, the outer peripheral edge of the optical element 22 may be integrally covered with an annular protection member, and the outer circumferential surface of the protection member may be fixed to the second abutting surface 32S. According to the other modified embodiment, it is possible to protect the optical element 22 and improve the fixing property to the second abutting surface 32S by selecting an appropriate material for the protection member, compared to the case where the optical element 22 is directly fixed to the second abutting surface 32S.

The first abutting portion 31 that positions the holder 21H in the main scanning direction is substantially the only member for positioning the holder 21H. That is, before the holder 21H is fixed by the adhesive 31A, the holder 21H abuts on the first abutting portion 31, and is thereby restricted from moving (namely, is positioned) in the main scanning direction. However, no other member in the housing 30 can restrict the movement of the holder 21H in the sub scanning direction, the optical axis direction, or the rotation direction around the optical axis. In addition, the second abutting portion 32 that positions the optical element 22 in the sub scanning direction is the only member for positioning the optical element 22. That is, before the optical element 22 is fixed by the adhesive 32A, the optical element 22 abuts on the second abutting portion 32, and is thereby restricted from moving (namely, is positioned) in the sub scanning direction. However, no other member in the housing 30 can restrict the movement of the optical element 22 in the main scanning direction or the optical axis direction.

In order to form a precise beam spot on the scanned surface, the light source unit 21 and the optical element 22 constituting an incident optical system to the polygon mirror 24 need to be assembled into the housing 30 after high-precision positioning adjustment in the main scanning direction, sub scanning direction, and optical axis direction is conducted. In addition, the beam pitch of the multi-beam light needs to be adjusted to match the resolution of an image formed on the photoconductor drum 14.

As a result, in the present embodiment, as schematically shown in FIG. 5, the adjustment is conducted by using a first adjusting tool 40 and a second adjusting tool 50. The first adjusting tool 40 is configured to hold the holder 21H in which the light source unit 21 has been integrally assembled, move the holder 21H in the sub scanning direction and the optical axis direction, and rotate the holder 21H around the optical axis. The second adjusting tool 50 is configured to hold the optical element 22 and move the optical element 22 in the main scanning direction and the optical axis direction.

Figure 9:
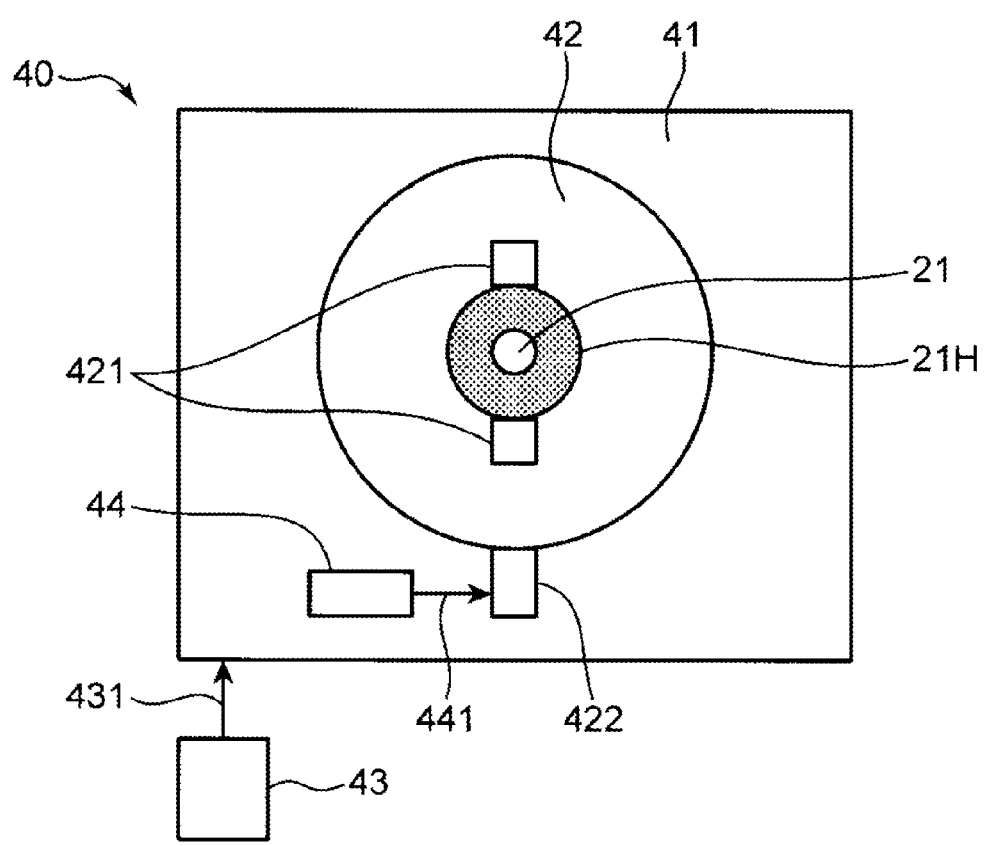
FIG. 9 is a front view of a first adjusting tool holding the holder.
Figure 10:
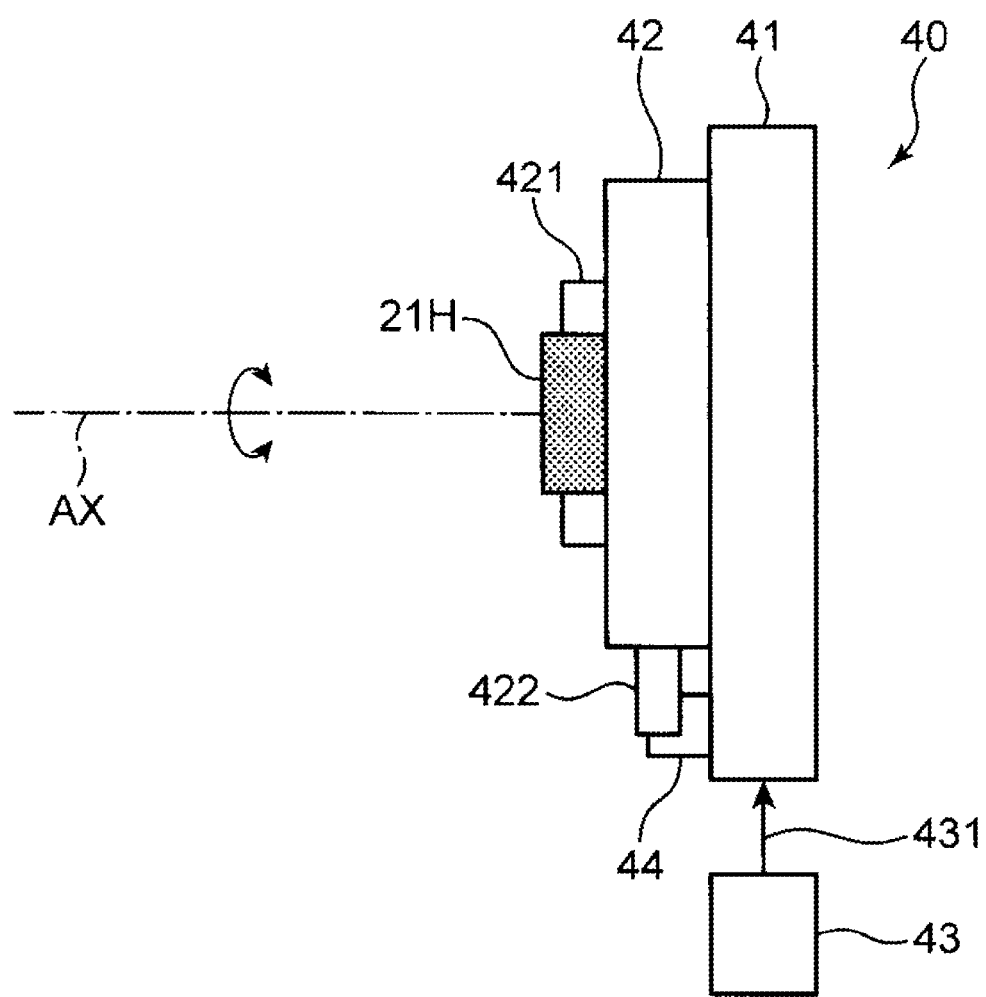
FIG. 10 is a side view of the first adjusting tool.

FIG. 9 is a front view of the first adjusting tool 40. FIG. 10 is a side view of the first adjusting tool 40. The first adjusting tool 40 includes a first substrate 41, a second substrate 42, a first adjusting member 43, and a second adjusting member 44. The first substrate 41 is a moving substrate that is attached to a fixed substrate (not shown) so as to be movable in the sub scanning direction. The second substrate 42 is a disk-type substrate, and a rotation shaft is provided in the center thereof. The first substrate 41 holds the second substrate 42 in such a manner that the second substrate 42 can rotate around the axis of the rotation shaft. The second substrate 42 holds the holder 21H in the state where the optical axis of the light source unit 21 matches the rotation shaft. A pair of chucks 421 are mounted on the second substrate 42 for the second substrate 42 to hold the holder 21H. It is noted that the fixed substrate with the first substrate 41 attached thereto can move in the optical axis direction along the guide member (not shown).

The first adjusting member 43 and the second adjusting member 44 include micrometer-type movers 431 and 441, respectively. The movers 431 and 441 are configured to move back and forth by a micrometer order. The mover 431 of the first adjusting member 43 is connected to the first substrate 41. The second adjusting member 44 is mounted on the first substrate 41. The mover 441 of the second adjusting member 44 is connected to a pressing piece 422 that projects from the outer peripheral edge of the second substrate 42 outward in the radius direction.

When the mover 431 of the first adjusting member 43 moves back and forth, the first substrate 41 moves back and forth in the sub scanning direction. Of course, when the first substrate 41 moves, the second substrate 42 and the holder 21H held thereby also move back and forth in the sub scanning direction. When the mover 441 of the second adjusting member 44 moves back and forth, the second substrate 42 rotates around the axis of the rotation shaft relative to the first substrate 41. Of course, when the second substrate 42 rotates, the holder 21H rotates, too. This makes it possible to adjust the beam pitch. That is, the beam pitch of the multi-beam light can be easily adjusted by rotating the second substrate 42 after the positional relationship between the light source unit 21 and the optical element 22 is established by moving the first substrate 41 in the sub scanning direction and the optical axis direction.

Figure 11:
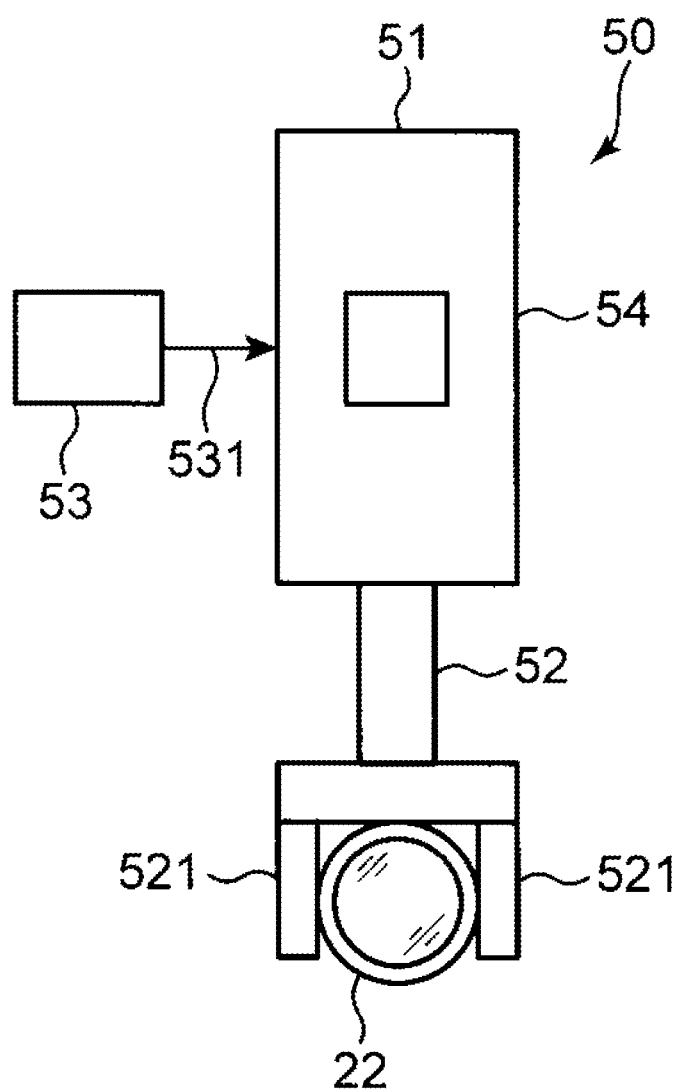
FIG. 11 is a front view of a second adjusting tool that holds an optical element.
Figure 12:
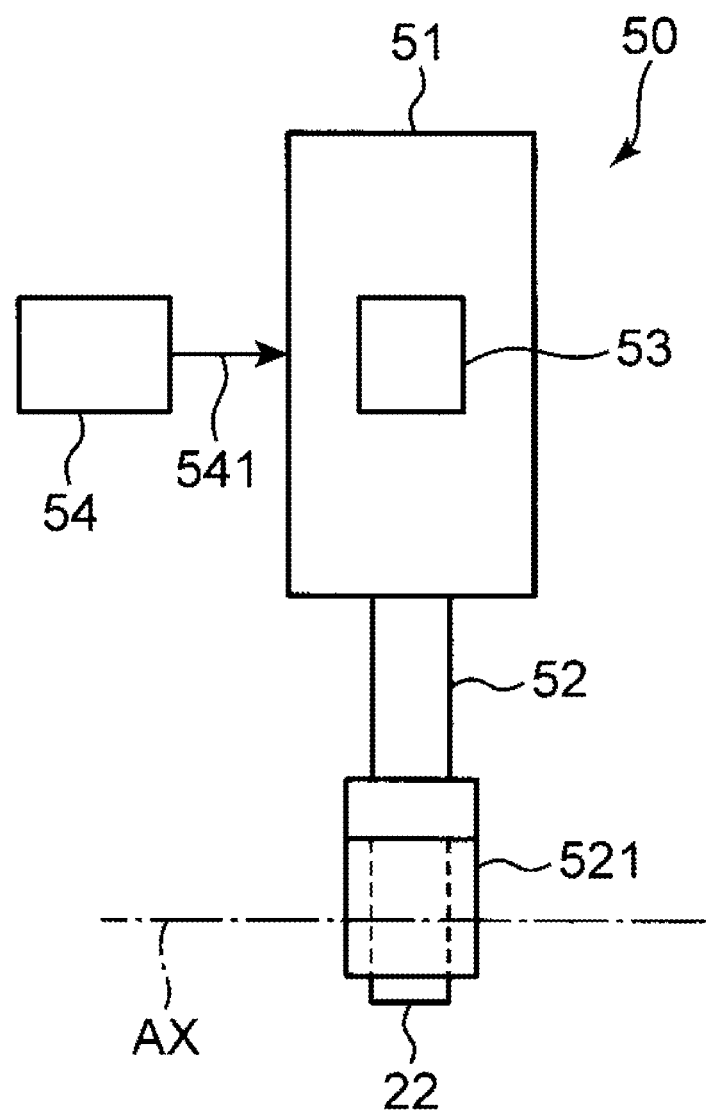
FIG. 12 is a side view of the second adjusting tool.

FIG. 11 is a front view of the second adjusting tool 50 that holds the optical element 22. FIG. 12 is a side view of the second adjusting tool 50. The second adjusting tool 50 includes a moving stage 51, a support arm 52, a third adjusting member 53, and a fourth adjusting member 54. The moving stage 51 is held by a moving support substrate (not shown) so as to be movable in the optical axis direction. Furthermore, the moving support substrate is held by a fixed support substrate (not shown) so as to be movable in the main scanning direction. The support arm 52 is integrally attached to the moving stage 51, and includes a pair of chuck claws 521 that hold the outer circumferential surface of the optical element 22.

The third adjusting member 53 and the fourth adjusting member 54 include micrometer-type movers 531 and 541, respectively. The movers 531 and 541 are configured to move back and forth by a micrometer order. The mover 531 of the third adjusting member 53 is connected to the moving stage 51. The mover 541 of the fourth adjusting member 54 is connected to the moving support substrate. When the mover 531 of the third adjusting member 53 moves back and forth, the moving stage 51 moves back and forth in the main scanning direction. Of course, when the moving stage 51 moves, the support arm 52 and the optical element 22 held thereby also move back and forth in the main scanning direction. When the mover 541 of the fourth adjusting member 54 moves back and forth, the moving stage 51 moves back and forth in the optical axis direction, and in conjunction with this, the optical element 22 moves back and forth in the optical axis direction.

Figure 13:
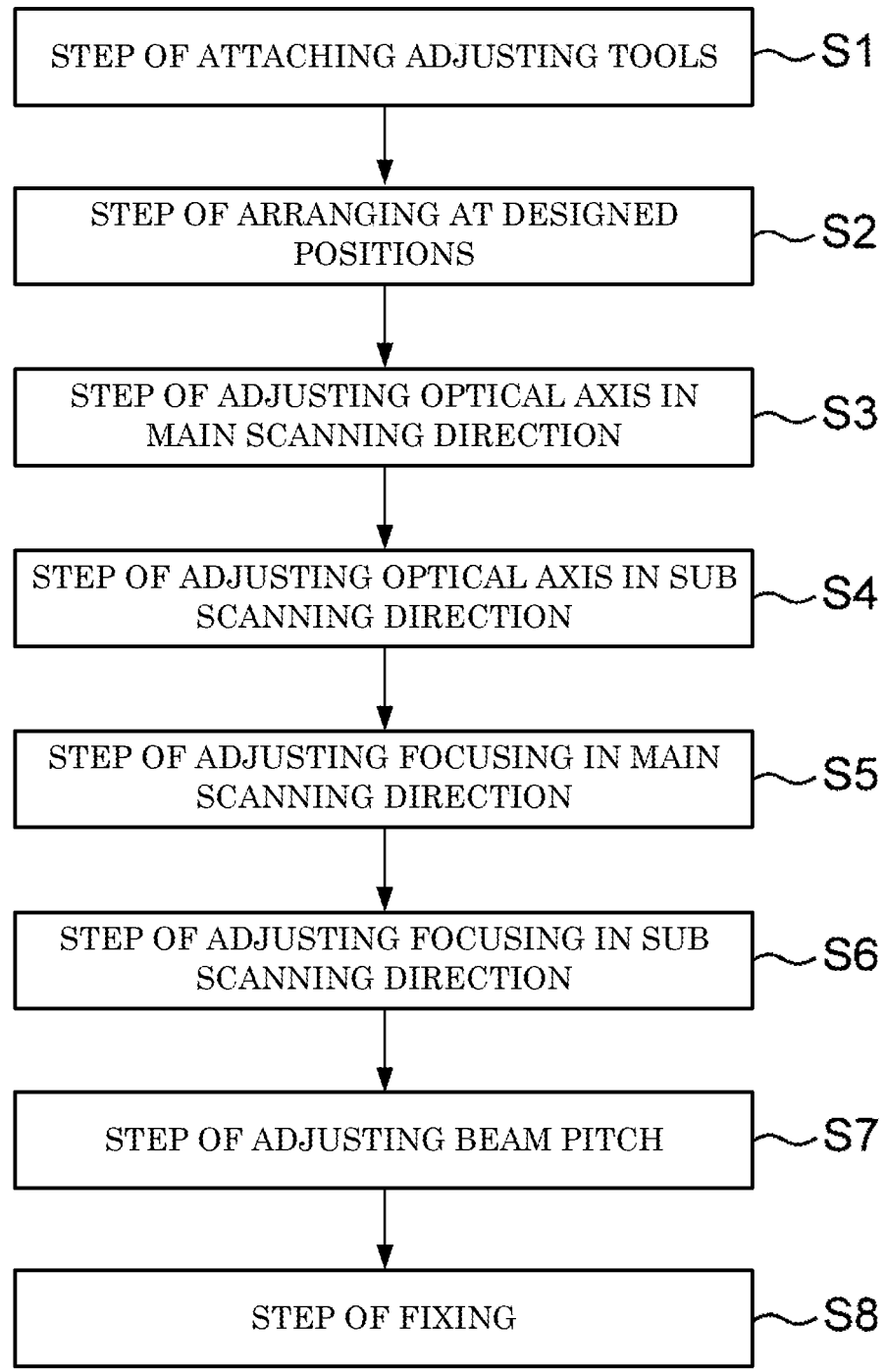
FIG. 13 is a flowchart showing procedures of beam adjustment method of multi-beam light.

Next, a description is given of a beam adjustment method for adjusting beams of multi-beam light in the optical scanning device 11. FIG. 13 is a flowchart listing the steps that are executed in the beam adjustment method in order. The beam adjustment method includes the following steps S1-S8.

[Step S1] Step of attaching adjusting tools: the step of attaching the holder 21H holding the light source unit 21 to the first adjusting tool 40, and the optical element 22 to the second adjusting tool 50.

[Step S2] Step of arranging at designed positions: the step of arranging various optical parts of the optical scanning device 11 at predetermined designed positions in the housing 30.

[Step S3] Step of adjusting optical axis in main scanning direction: the step of adjusting the optical axis in the main scanning direction by moving the second adjusting tool 50 (the optical element 22) in the main scanning direction.

[Step S4] Step of adjusting optical axis in sub scanning direction: the step of adjusting the optical axis in the sub scanning direction by moving the first adjusting tool 40 (the light source unit 21) in the sub scanning direction. It is noted that step S4 and step S3 may be exchanged in the execution order.

[Step S5] Step of adjusting focusing in main scanning direction: the step of adjusting the focal position in the main scanning direction by moving the second adjusting tool 50 (the optical element 22) in the optical axis direction.

[Step S6] Step of adjusting focusing in sub scanning direction: the step of adjusting the focal position in the sub scanning direction by moving the first adjusting tool 40 and the second adjusting tool 50 integrally while maintaining the positional relationship between them.

[Step S7] Step of adjusting beam pitch: the step of adjusting the beam pitch by causing the first adjusting tool 40 to rotate the holder 21H around the optical axis.

[Step S8] Step of fixing: the step of fixing the holder 21H and the optical element 22 to the housing 30.

The following describes each of the steps in detail.

<Step S1: Step of Attaching Adjusting Tools>

As shown in FIG. 9 and FIG. 10, the holder 21H integrally holding the light source unit 21 is strongly pinched by the pair of chucks 421 of the first adjusting tool 40. This enables the light source unit 21 to move in the sub scanning direction with the operation of the first adjusting member 43, and rotate around the optical axis with the operation of the second adjusting member 44. In addition, as shown in FIG. 11 and FIG. 12, the optical element 22 is strongly pinched by the chuck claws 521 of the second adjusting tool 50. This enables the optical element 22 to move in the main scanning direction with the operation of the third adjusting member 53, and move in the optical axis direction with the operation of the fourth adjusting member 54. It is noted that if the first adjusting tool 40 and the second adjusting tool 50 are connected to each other when the fourth adjusting member 54 is operated, the light source unit 21 and the optical element 22 can be integrally moved in the optical axis direction.

<Step S2: Step of Arranging at Designed Positions>

Figure 14:
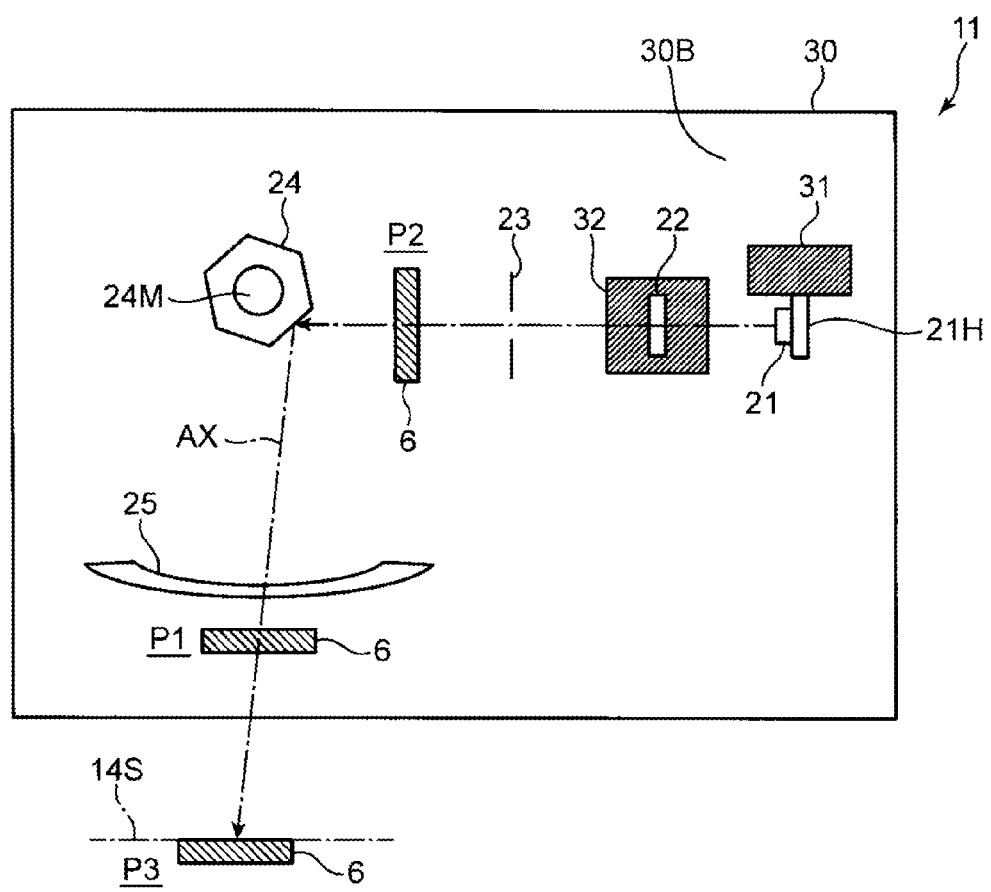
FIG. 14 is a schematic diagram showing positions at which an imaging sensor for checking light beam is disposed during the beam adjustment.

In this step, the focal positions in the main and sub scanning directions are roughly adjusted. With reference to FIG. 14, the aperture 23, the polygon mirror 24, and the scanning lens 25 are installed at the predetermined designed positions on the bottom plate 30B of the housing 30. As explained with reference to FIG. 6, the holder 21H is arranged at a predetermined designed position in the state where a part of the holder 21H held by the first adjusting tool 40 abuts on the first abutting portion 31 of the housing 30. In addition, as explained with reference to FIG. 7, the optical element 22 is arranged at a predetermined designed position in the state where a part of the peripheral edge of the optical element 22 held by the second adjusting tool 50 abuts on the second abutting portion 32.

In the optical axis adjustment, the focal position adjustment, and the beam pitch adjustment described in the following, an imaging sensor 6 is used to check the state of the adjustments, wherein the imaging sensor 6 can capture an image of light beams. The imaging sensor 6 is an area sensor, such as a CCD element, that can obtain a two-dimensional image. FIG. 14 shows positions at which the imaging sensor 6 is disposed respectively in the adjustment steps. The imaging sensor 6 is disposed at a position P1 in the steps of adjusting the optical axis in the main and sub scanning directions in steps S3 and S4, wherein the position P1 is on the optical axis AX between the scanning lens 25 and the scanned surface (the circumferential surface 14S of the photoconductor drum 14). The imaging sensor 6 is disposed at a position P2 in the step of adjusting the focal position in the main scanning direction in step S5, wherein the position P2 is on the optical axis AX between the aperture 23 and the polygon mirror 24. Furthermore, the imaging sensor 6 is disposed at a position P3 in the step of adjusting the focal position in the sub scanning direction in step S6 and in the step of adjusting the beam pitch in step S7, wherein the position P3 corresponds to the circumferential surface 14S. The imaging sensor 6 is preferably held by a tool such that it can be installed and moved easily among the positions P1 to P3. By disposing the imaging sensor 6 at the positions where it can evaluate the light beam precisely in the adjustment steps, it is possible to perform each adjustment step efficiently, and execute the adjustment work with a high precision.

<Step S3: Step of Adjusting Optical Axis in Main Scanning Direction>

Figure 15:
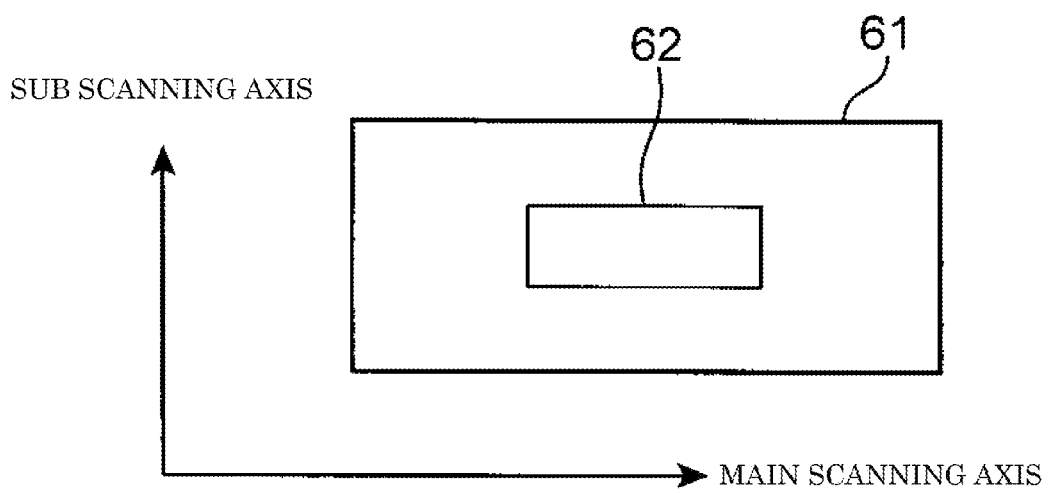
FIG. 15 is a diagram showing an imaging area of the imaging sensor and a target region.

FIG. 15 is a diagram showing an imaging area 61 of the imaging sensor 6 and a target region 62 that is used to adjust the optical axis of the light beam. When the beam spot of the light beam is included in the target region 62 in the state where the imaging sensor 6 is disposed at the position P1, it is determined that the optical adjustment is completed. FIG. 16A is a diagram showing an example of a spot 63 of a light beam detected by the imaging sensor 6 at the position P1 when the light source unit 21 is lighted after a rough adjustment is conducted in step S2. In this example, the spot 63 is shifted with respect to the target region 62 in both the main scanning direction and the sub scanning direction.

In step S3, a position matching between the spot 63 and the target region 62 in the main scanning direction is performed by moving the second adjusting tool 50 (the optical element 22) in the main scanning direction. While the second adjusting tool 50 is moved, a part of the peripheral edge of the optical element 22 is kept abutting on the second abutting portion 32 to prevent the optical element 22 from shifting in the sub scanning direction. Specifically, as shown in FIG. 16B, the worker moves the moving stage 51 in the main scanning direction by operating the third adjusting member 53 (for example, rotating the dial of the micrometer). With this operation, the optical element 22 moves in the main scanning direction as indicated by the arrow A1. This allows the spot 63 to move in the arrow A1 direction as well, as shown in FIG. 16A. This makes it possible to match the position of the spot 63 in the main scanning direction to the target region 62.

<Step S4: Step of Adjusting Optical Axis in Sub Scanning Direction>

Figure 17B:
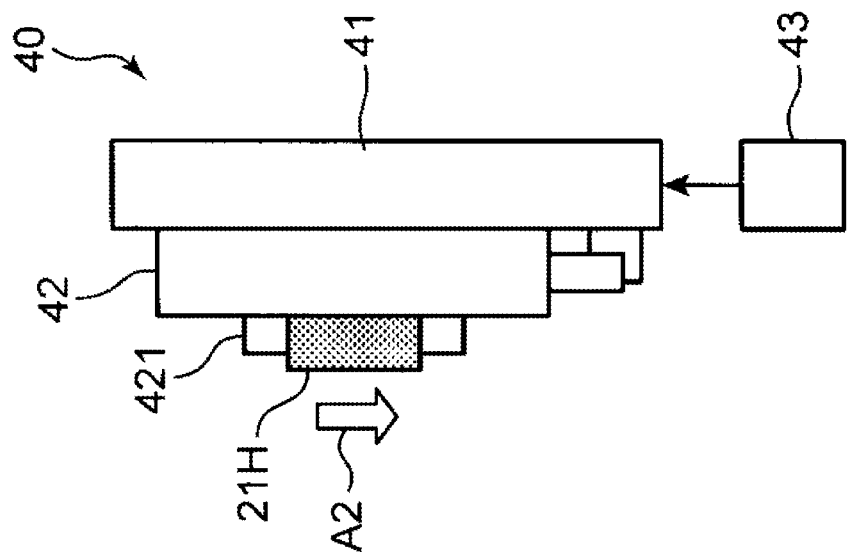
FIG. 17A and FIG. 17B are diagrams for explaining how the optical axis adjustment in the sub scanning direction is conducted.
Figure 17A:
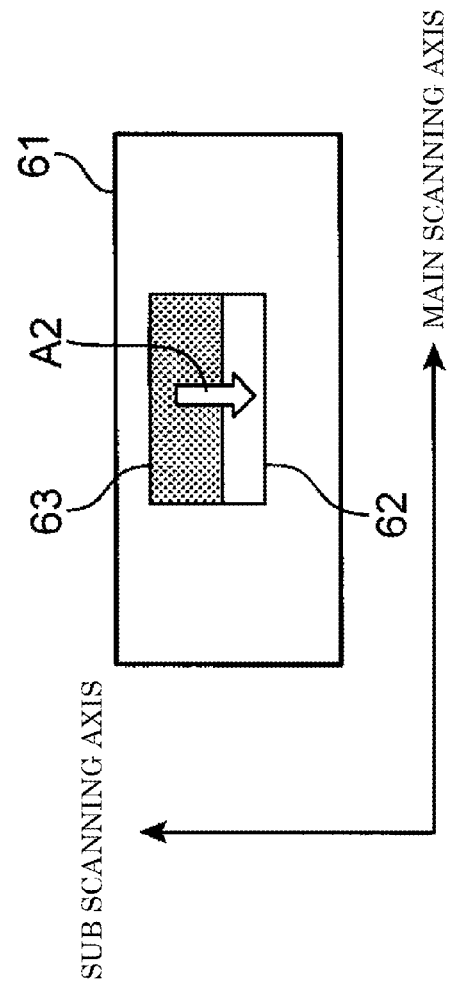

FIG. 17A is a diagram showing the relationship among the imaging area 61, the target region 62, and the spot 63 of the light beam after the step S3 is executed. With the execution of step S3, the shifting of the spot 63 with respect to the target region 62 in the main scanning direction has been corrected, but a shifting in the sub scanning direction remains.

In step S4, a position matching between the spot 63 and the target region 62 in the sub scanning direction is performed by moving the first adjusting tool 40 (the holder 21H) in the sub scanning direction. While the first adjusting tool 40 is moved, a part of a side peripheral edge of the holder 21H is kept abutting on the first abutting portion 31 to prevent the light source unit 21 from shifting in the main scanning direction. Specifically, as shown in FIG. 17B, the worker moves the first substrate 41 in the sub scanning direction by operating the first adjusting member 43. With this operation, the holder 21H holding the light source unit 21 moves in the sub scanning direction as indicated by the arrow A2. This allows the spot 63 to move in the arrow A2 direction as well, as shown in FIG. 17A. This makes it possible to match the position of the spot 63 in the sub scanning direction to the target region 62.

Figure 18:
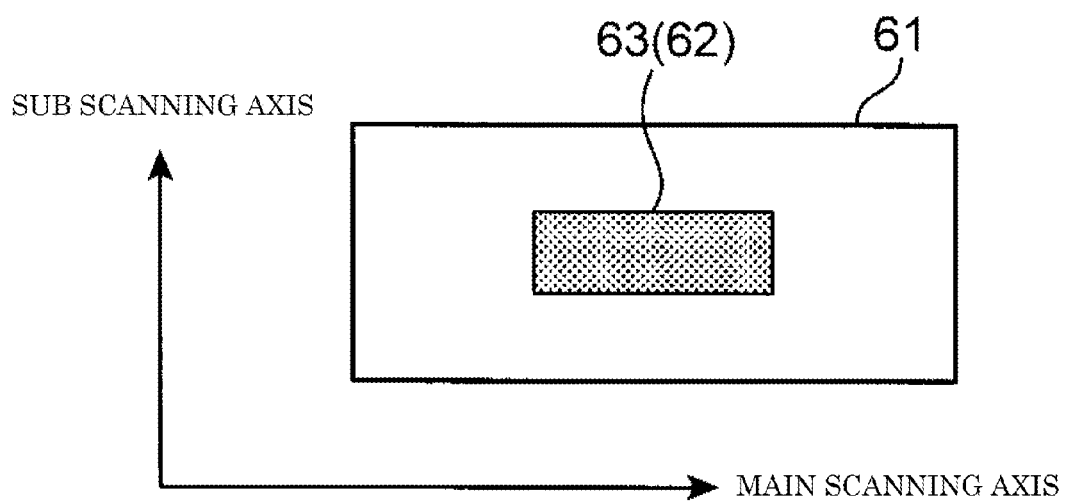
FIG. 18 is a diagram showing an image captured by the imaging sensor when the optical axis adjustment is completed.

FIG. 18 is a diagram showing the relationship among the imaging area 61, the target region 62, and the spot 63 of the light beam after the steps S3 and S4 are executed. As shown in FIG. 18, the spot 63 is included in the range of the target region 62, and the shifting in the main scanning direction and sub scanning direction has been corrected. This completes the optical axis adjustment.

<Step S5: Step of Adjusting Focusing in Main Scanning Direction>

Figure 19:
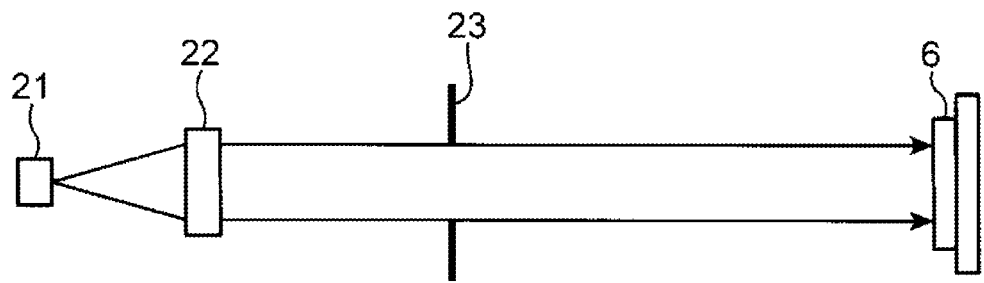
FIG. 19 is a cross section taken along a plane including the main scanning direction, for explaining a focusing adjustment in the main scanning direction.

FIG. 19 is a cross section taken along a plane including the main scanning direction, showing the state where the focusing adjustment in the main scanning direction is completed. In step S5, when light beams are parallel to each other after passing through the optical element 22, it is determined that the adjustment of the focal position in the main scanning direction is completed. The imaging sensor 6 is disposed at the position P2 in rear of the aperture 23. After the light beams become parallel beams, the imaging sensor 6 detects an image of light that is the same size as the opening diameter of the aperture 23 in the main scanning direction, as shown in FIG. 19.

Figure 20A:
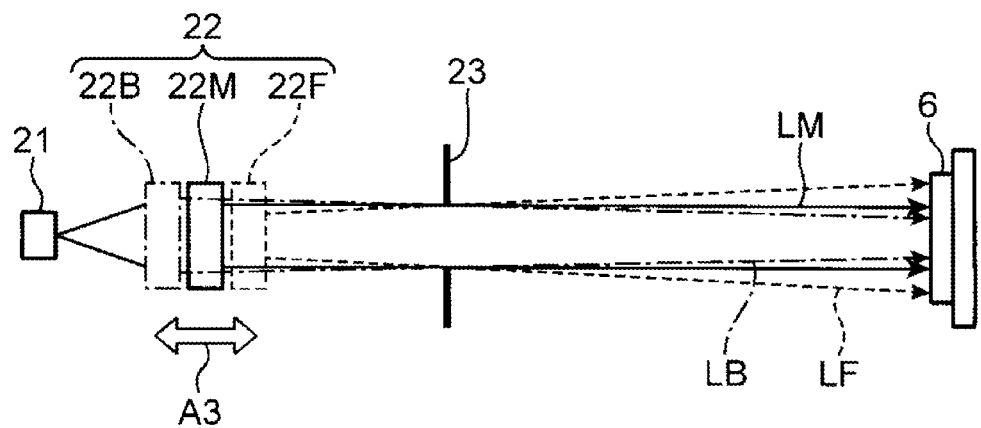
FIG. 20A and FIG. 20B are diagrams for explaining how the focusing adjustment in the main scanning direction is conducted.

FIG. 20A is a cross section taken along a plane including the main scanning direction, schematically showing the state where the focusing adjustment in the main scanning direction is executed. In step S5, a position at which, after passing through the aperture 23, light beams become parallel to each other is detected while allowing the second adjusting tool 50 (the optical element 22) to move in the optical axis direction. While the second adjusting tool 50 is moved, a part of the peripheral edge of the optical element 22 is kept abutting on the second abutting portion 32 to prevent the optical element 22 from shifting in the sub scanning direction. If the optical element 22 is disposed at a position 22B that is too close to the light source unit 21, the light beams LB become convergent light beams. On the other hand, if the optical element 22 is disposed at a position 22F that is too far away from the light source unit 21, the light beams LF become diffused light beams. When the optical element 22 is disposed at a position 22M that is appropriately distanced from the light source unit 21, the light beams LM become parallel light beams.

Figure 20B:
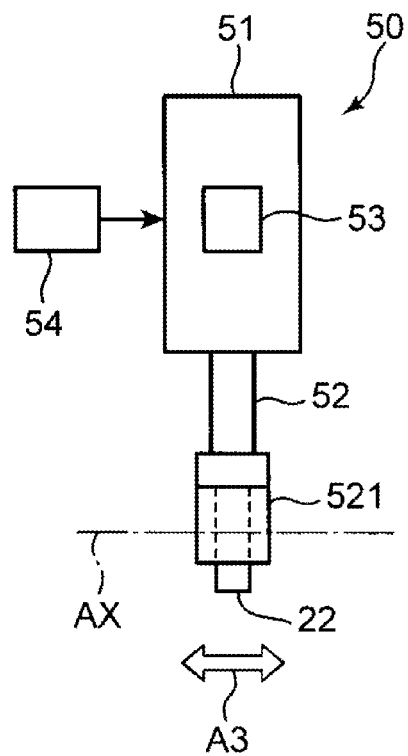

Specifically, the worker moves the moving stage 51 in the optical axis direction by operating the fourth adjusting member 54, as shown in FIG. 20B. With this operation, the optical element 22 also moves in the optical axis direction indicated by the arrow A3, as shown in FIG. 20A. This allows the above-mentioned position 22M to be detected, and makes it possible to convert the light beams that pass through the optical element 22, to parallel light beams.

<Step S6: Step of Adjusting Focusing in Sub Scanning Direction>

Figure 21:
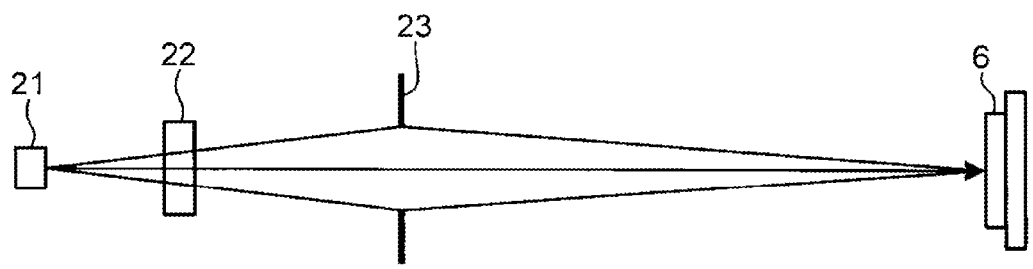
FIG. 21 is a cross section taken along a plane including the sub scanning direction, for explaining the focusing adjustment in the sub scanning direction.

FIG. 21 is a cross section taken along a plane including the sub scanning direction, showing the state where the focusing adjustment in the sub scanning direction is completed. In step S6, it is determined that the adjustment of the focal position is completed when the light beams that have passed through the optical element 22 are focused on the deflection surface of the polygon mirror 24 or the circumferential surface 14S of the photoconductor drum 14 in the sub scanning direction. In the present embodiment, the imaging sensor 6 is disposed at the position P3 that corresponds to the circumferential surface 14S. When the light beams are focused on the position P3, the imaging sensor 6 detects an optical image of a beam spot of a predetermined size in the sub scanning direction, as shown in FIG. 21.

Figure 22A:
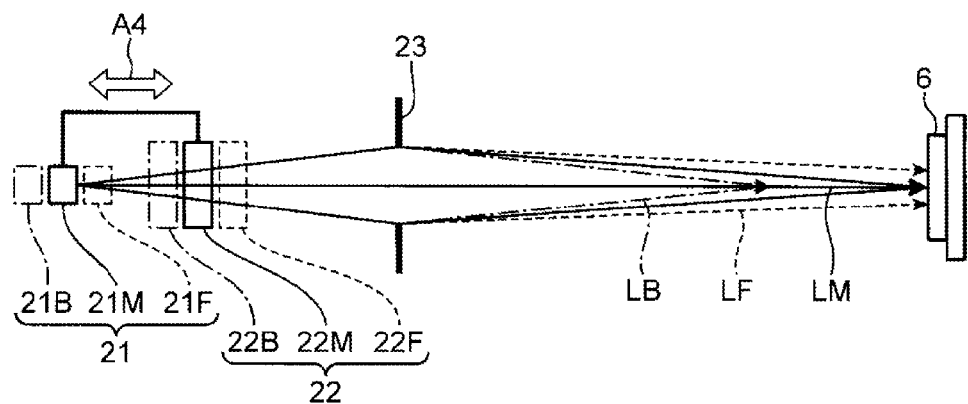
FIG. 22A and FIG. 22B are diagrams for explaining how the focusing adjustment in the sub scanning direction is conducted.

FIG. 22A is a cross section taken along a plane including the sub scanning direction, schematically showing the state where the focusing adjustment in the sub scanning direction is executed. In step S6, a position at which light beams that have passed through the aperture 23 are focused on the light receiving surface of the imaging sensor 6 is detected while integrally moving the first adjusting tool 40 (the light source unit 21) and the second adjusting tool 50 (the optical element 22) in the optical axis direction while maintaining the positional relationship therebetween. While the first adjusting tool 40 and the second adjusting tool 50 are moved, a part of a side peripheral edge of the holder 21H is kept abutting on the first abutting portion 31 to prevent the light source unit 21 from shifting in the main scanning direction. In addition, a part of the peripheral edge of the optical element 22 is kept abutting on the second abutting portion 32 to prevent the optical element 22 from shifting in the sub scanning direction.

If the light source unit 21 and the optical element 22 are disposed at the positions 21B and 22B that are too far away from the aperture 23, the light beams LB are focused in front of the imaging sensor 6 on the optical axis. On the other hand, if the light source unit 21 and the optical element 22 are disposed at the positions 21F and 22F that are too close to the aperture 23, the light beams LF are focused in rear of the imaging sensor 6 on the optical axis. When the light source unit 21 and the optical element 22 are disposed at the positions 21M and 22M that are appropriately distanced from the aperture 23, the light beams LM are focused on the light receiving surface of the imaging sensor 6.

Figure 22B:
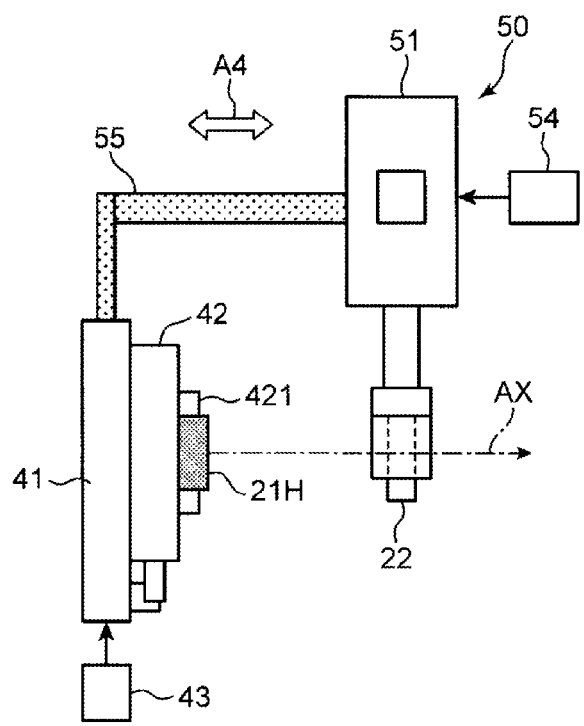

Specifically, as shown in FIG. 22B, first the worker connects the first adjusting tool 40 and the second adjusting tool 50 by using a connector 55. This is performed for the purpose of fixing the positional relationship between the light source unit 21 and the optical element 22 so that the focal position in the main scanning direction adjusted in step S5 is not shifted. The connector 55 is a member having the shape of a letter L whose one end is connected to the first substrate 41 of the first adjusting tool 40, and the other end is connected to the moving stage 51 of the second adjusting tool 50. This connection enables the light source unit 21 and the optical element 22 to be integrally moved in the optical axis direction.

Next, the worker moves the moving stage 51 in the optical axis direction indicated by the arrow A4 by operating the fourth adjusting member 54. With the movement of the moving stage 51, the first substrate 41 connected by the connector 55 also moves in the optical axis direction. With this movement, as shown in FIG. 22A, the light source unit 21 and the optical element 22 also move in the optical axis direction as indicated by the arrow A4. This movement makes it possible to detect the above-mentioned positions 21M and 22M, and enables the light beams that have passed through the optical element 22 and the aperture 23, to be focused on the circumferential surface 14S.

<Step S7: Step of Adjusting Beam Pitch>

Figure 23:
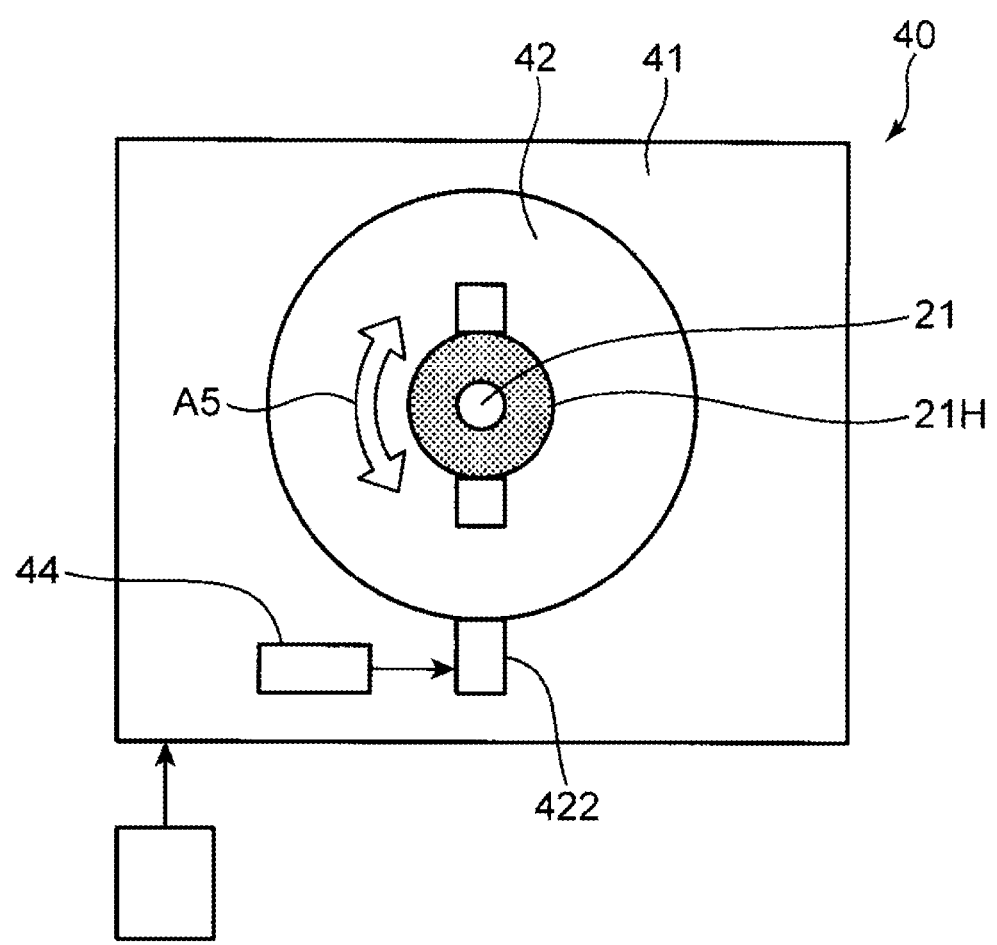
FIG. 23 is a diagram for explaining how a beam pitch adjustment is conducted.

FIG. 23 is a diagram for explaining an example of the step of adjusting the beam pitch. In step S7, it is determined that the adjustment of the beam pitch is completed when the interval in the sub scanning direction between the beams of the multi-beam light emitted from the light source unit 21 becomes such an interval that corresponds to the resolution specified in the specifications. The imaging sensor 6 is disposed at the position P3 that corresponds to the circumferential surface 14S. In this example, the beam pitch is adjusted by rotating the holder 21H around the optical axis as indicated by the arrow A5. During this rotation, a part of a side peripheral edge of the holder 21H is kept abutting on the first abutting portion 31.

Figure 24:
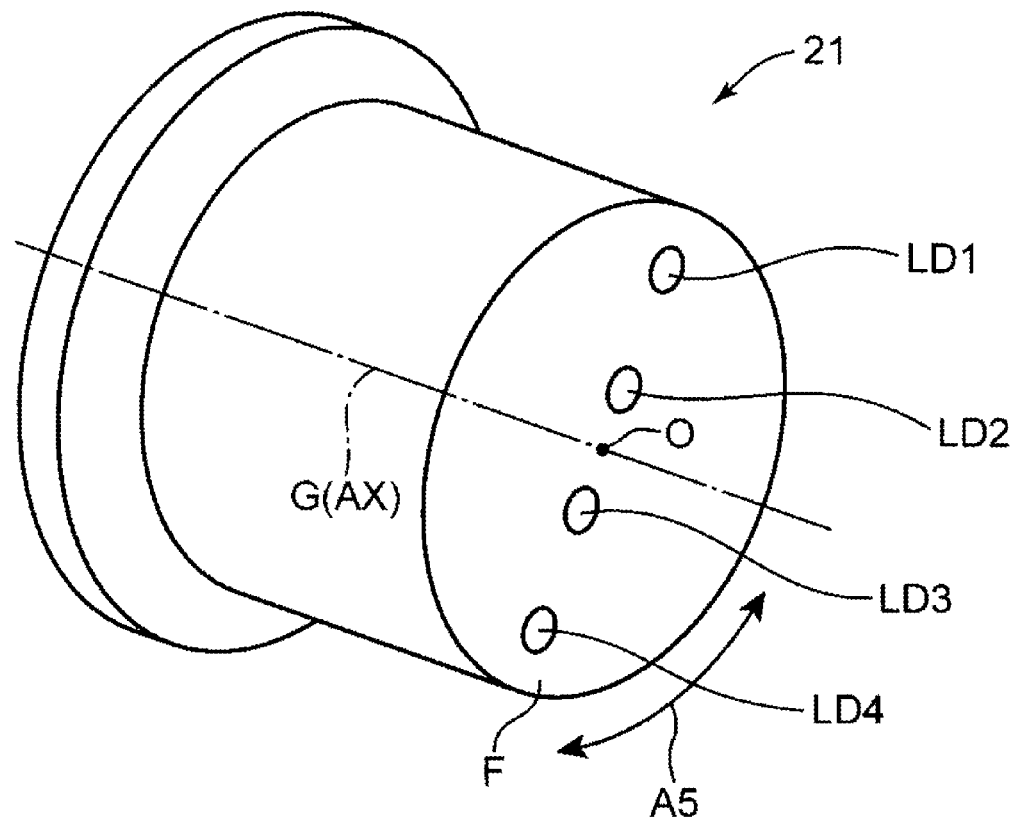
FIG. 24 is a perspective view of a light source unit of a 4-beam type.
Figure 25:
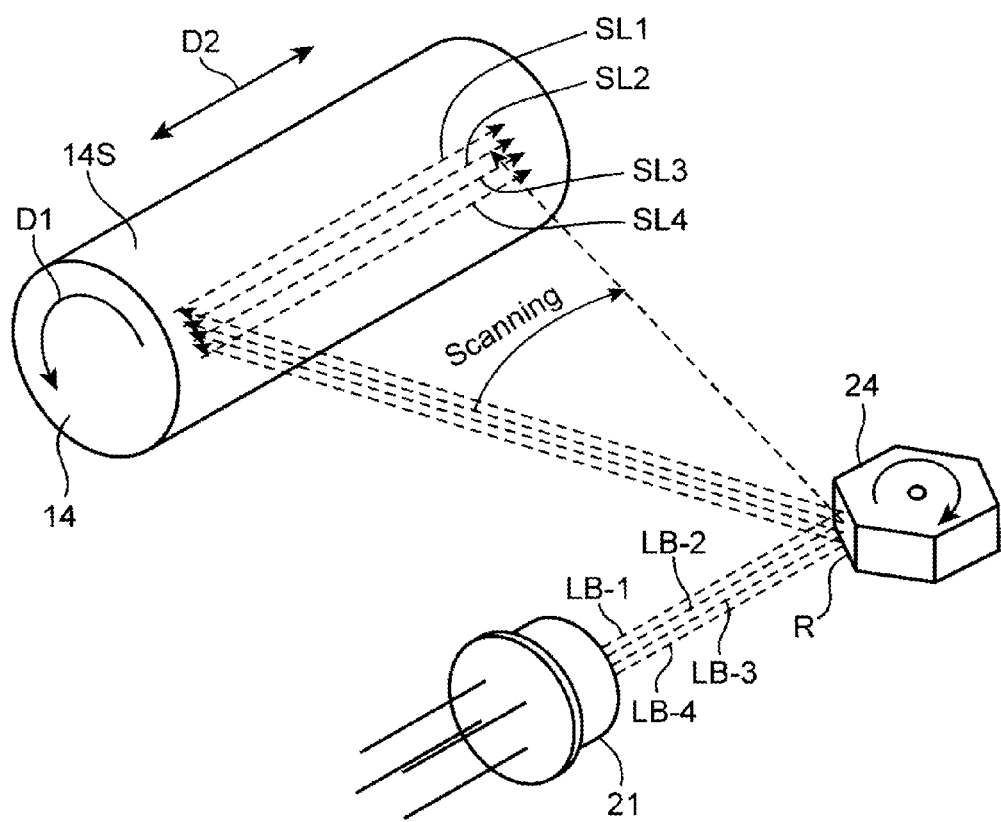
FIG. 25 is a schematic perspective view showing a state of scanning performed by the light source unit shown in FIG. 24.

FIG. 24 is a perspective view of the light source unit 21 of a 4-beam type. FIG. 25 is a schematic perspective view showing the state of the scanning performed by the light source unit 21 shown in FIG. 24. The light source unit 21 of this example is a monolithic multi-laser diode that includes a cylindrical package unit and four laser diodes LD1, LD2, LD3, and LD4 that are arranged in alignment at predetermined intervals in a front surface of the package unit. The four laser diodes LD1, LD2, LD3, and LD4 are aligned on a line that has an inclination angle with respect to each of the main scanning direction and the sub scanning direction.

As shown in FIG. 25, four light beams LB-1, LB-2, LB-3, and LB-4 are respectively emitted from the laser diodes LD1, LD2, LD3, and LD4 toward the polygon mirror 24. It is noted that the focusing optical system is omitted in FIG. 25. With the rotation of the polygon mirror 24, the four light beams LB-1, LB-2, LB-3, and LB-4 scan the circumferential surface 14S of the photoconductor drum 14 along the main scanning direction D2. As a result of this, four scan lines SL1, SL2, SL3, and SL4 are drawn on the circumferential surface 14S of the photoconductor drum 14. Since the light beams LB-1, LB-2, LB-3, and LB-4 are modulated in accordance with the image data, an electrostatic latent image is formed on the circumferential surface 14S in accordance with the image data.

Here, in the state where the four light beams LB-1, LB-2, LB-3, and LB-4 are aligned in the sub scanning direction D1 (the rotation direction of the photoconductor drum 14) in the stated order, the four light beams LB-1 to LB-4 draw the four scan lines SL that extend in the main scanning direction D2. This is because, as shown in FIG. 24, the four laser diodes LD1 to LD4 are linearly arranged at predetermined intervals. As a result, the beam pitch of the light beams LB-1 to LB-4 in the sub scanning direction, namely, the resolution (dpi) of the image to be drawn depends on the pitch at which the four laser diodes LD1 to LD4 are arranged.

The beam pitch can be adjusted by rotating the light source unit 21 around the optical axis AX. Specifically, it is possible to change the arrangement pitch of the four laser diodes LD1 to LD4 in appearance by rotating the light source unit 21 in a direction indicated by the arrow A5 in the drawing, around, as the rotation axis, a normal line G that passes a center O of the front surface F of the light source unit 21. That is, when a light-emitting portion 30A is rotated clockwise around the axis of the normal line G, the beam pitch in the sub scanning direction is reduced. On the other hand, when the light-emitting portion 30A is rotated counterclockwise, the beam pitch in the sub scanning direction is increased. It is noted that the normal line G is made to match the optical axis AX. As a result, it is possible to obtain a beam pitch corresponding to the set resolution of the image by adjusting the rotation of the light source unit 21.

A specific work of the worker in step S7 is to rotate the second substrate 42 by operating the second adjusting member 44. The second substrate 42 holds the holder 21H in the state where the optical axis AX matches the normal line G of the light source unit 21. The holder 21H rotates around the optical axis indicated by the arrow A5 when the second adjusting member 44 presses or pulls the pressing piece 422. The worker, while monitoring the image captured by the imaging sensor 6, can detect a rotation position of the light source unit 21 at which a predetermined resolution can be obtained.

<Step S8: Step of Fixing>

In the step of fixing, the light source unit 21 and the optical element 22 are fixed to the housing 30 in the state where the adjustments in steps S3 to S7 are completed. Specifically, as shown in FIG. 6, the worker fixes a part of the outer peripheral edge of the holder 21H to the first abutting surface 31S of the first abutting portion 31 by using the adhesive 31A. Furthermore, as shown in FIG. 7, the worker fixes a part of the outer peripheral edge of the optical element 22 to the second abutting surface 32S of the second abutting portion 32 by using the adhesive 31A. It is noted that during the execution of steps S3 to S7, a part of the outer peripheral edge of the holder 21H is kept to be abutting on the first abutting surface 31S, and a part of the outer peripheral edge of the optical element 22 is kept to be abutting on the second abutting surface 32S. As a result, in step S8, the above-mentioned parts are adhered to the corresponding portions on which they are abutting at the time of the end of step S7. It is noted that the means for fixing the holder 21H and the optical element 22 to the housing 30 is not limited to the adhesive, but may be, for example, screws.

According to a conventional adjustment method for use in a configuration where the multi-beam-type light source unit 21 is used, it is not possible to conduct both an adjustment of the beam diameter and the optical axis of the multi-beam light and an adjustment of the pitch between light beams in the sub scanning direction. However, according to the beam adjustment method described above, it is possible to precisely conduct various types of beam adjustments on the multi-beam light in the optical scanning device 11 that includes the multi-beam-type light source unit 21 and the function-integrated-type optical element 22 that has both the collimator lens function and the cylindrical lens function. That is, according to the beam adjustment method described above, optical axis adjustment in the main scanning direction and the sub scanning direction and focal position adjustment are conducted while a part of the holder 21H is abutting on the first abutting surface 31S and a part of the peripheral edge of the optical element 22 is abutting on the second abutting portion 32, and thus these adjustments can be conducted in a reliable manner. Furthermore, the holder 21H held by the second substrate 42 of the first adjusting tool 40 is rotatable around the optical axis, and thus an adjustment of the beam pitch of the multi-beam light can be conducted as well.

In addition, according to the optical scanning device 11 of the present embodiment, the holder 21H is fixed to the first abutting portion 31 by the adhesive 31A in the state where a part of the holder 21H is abutting on the first abutting portion 31, and the optical element 22 is fixed to the second abutting portion 32 by the adhesive 32A in the state where a part of the peripheral edge of the optical element 22 is abutting on the second abutting portion 32. In addition, the holder 21H is restricted only in the main scanning direction, and the optical element 22 is restricted only in the sub scanning direction. This makes it possible to conduct optical axis adjustment and focal position adjustment in a reliable manner in the state where the abutting of the holder 21H and the optical element 22 is maintained. Furthermore, it is possible to conduct an adjustment of the beam pitch of the multi-beam light emitted from the light source unit 21 by rotating the holder 21H around the optical axis in the state where the abutting is maintained. As a result, it is possible to adjust the beam pitch without causing an optical axis shifting or a focal position shifting. In addition, since various types of beam adjustments, particularly an adjustment of the beam pitch of the multi-beam, can be conducted precisely, it is possible to realize the optical scanning device 11 that can draw an electrostatic latent image that contributes to forming a high-quality image.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A beam adjustment method for use in an optical scanning device that includes a housing, and a light source for emitting multi-beam light, a holder for holding the light source, an optical element having both a collimator lens function and a cylindrical lens function, an aperture, a deflector, and a focusing optical system that are stored in the housing in alignment in an optical axis direction, the optical scanning device further including a first abutting portion which has a predetermined width in the optical axis direction and on which a part of the holder abuts in a main scanning direction, and a second abutting portion which has a predetermined width in the optical axis direction and on which a part of a peripheral edge of the optical element abuts in a sub scanning direction, the beam adjustment method comprising:

a step of allowing a first adjusting tool to hold the holder and allowing a second adjusting tool to hold the optical element, the first adjusting tool being configured to move in the sub scanning direction and the optical axis direction and rotate around an optical axis, and the second adjusting tool being configured to move in the main scanning direction and the optical axis direction;

a step of installing the aperture, the deflector, and the focusing optical system at predetermined designed positions in the housing, arranging the holder at a predetermined designed position in a state where a part of the holder held by the first adjusting tool abuts on the first abutting portion, and arranging the optical element at a predetermined designed position in a state where a part of the peripheral edge of the optical element held by the second adjusting tool abuts on the second abutting portion;

a step of adjusting the optical axis in the sub scanning direction by moving the first adjusting tool in the sub scanning direction while keeping the holder abutting on the first abutting portion, and adjusting the optical axis in the main scanning direction by moving the second adjusting tool in the main scanning direction while keeping the optical element abutting on the second abutting portion;

a step of adjusting a focal position in the main scanning direction such that light beams having passed through the aperture become parallel to each other, by moving the second adjusting tool in the optical axis direction while keeping the optical element abutting on the second abutting portion;

a step of adjusting a focal position in the sub scanning direction such that light beams are focused on a deflection surface of the deflector or a scanned surface, by integrally moving the first adjusting tool and the second adjusting tool in the optical axis direction while maintaining a positional relationship between the first adjusting tool and the second adjusting tool, keeping the holder abutting on the first abutting portion, and keeping the optical element abutting on the second abutting portion;

a step of adjusting a beam pitch by rotating the holder around the optical axis while keeping the holder abutting on the first abutting portion; and a step of fixing the part of the holder to the first abutting portion and fixing the part of the peripheral edge of the optical element to the second abutting portion.

2. The beam adjustment method according to claim 1, wherein an imaging sensor that can capture an image of a light beam is used, and the imaging sensor is disposed on the optical axis between the focusing optical system and the scanned surface during the step of adjusting the optical axis in the sub scanning direction and the main scanning direction, disposed on the optical axis between the aperture and the deflector during the step of adjusting the focal position in the main scanning direction, and disposed on the scanned surface during the step of adjusting the focal position in the sub scanning direction and the step of adjusting the beam pitch.

3. The beam adjustment method according to claim 1, wherein a tool including a first substrate and a second substrate is used as the first adjusting tool, the first substrate is movable in the sub scanning direction and the optical axis direction, and the second substrate is rotatably held by the first substrate and holds the holder in a state where the optical axis of the light source matches a rotation axis.

4. An optical scanning device comprising:

a light source unit held by a holder and configured to emit multi-beam light;

an optical element which has both a collimator lens function and a cylindrical lens function and on which the multi-beam light is incident;

an aperture configured to restrict the multi-beam light that has passed through the optical element;

a deflector configured to reflect the multi-beam light that has passed through the aperture and cause the multi-beam light to scan a scanned surface in a main scanning direction;

a focusing optical system disposed between the deflector and the scanned surface and configured to focus the multi-beam light on the scanned surface; and a housing storing the light source unit, the optical element, the aperture, the deflector, and the focusing optical system that are aligned in an optical axis direction in the stated order, wherein the housing includes:

a first abutting portion which has a predetermined width in the optical axis direction and on which a part of the holder abuts in the main scanning direction;

a second abutting portion which has a predetermined width in the optical axis direction and on which a part of a peripheral edge of the optical element abuts in a sub scanning direction;

a first fixing portion configured to fix the part of the holder to the first abutting portion; and a second fixing portion configured to fix the part of the peripheral edge of the optical element to the second abutting portion, and the holder is positioned in the main scanning direction by abutting on the first abutting portion, and the optical element is positioned in the sub scanning direction by abutting on the second abutting portion.

* * * * *